United States Patent
Sekiguchi et al.

(10) Patent No.: US 6,447,868 B1
(45) Date of Patent: Sep. 10, 2002

(54) OPTICAL MOLDING MATERIAL, AND OPTICAL DISK SUBSTRATE AND PRODUCTION METHOD THEREOF

(75) Inventors: Masayuki Sekiguchi; Toshihiro Ohtsuki; Takatoshi Ishigaki; Tatsuya Hirono, all of Tokyo (JP)

(73) Assignee: JSR Corporation, Tokyo (JP)

( * ) Notice: Subject to any disclaimer, the term of this patent is extended or adjusted under 35 U.S.C. 154(b) by 8 days.

(21) Appl. No.: 09/617,810

(22) Filed: Jul. 17, 2000

(30) Foreign Application Priority Data

Jul. 21, 1999 (JP) .......................... 11-206674

(51) Int. Cl.[7] .............................. B32B 3/02
(52) U.S. Cl. ............... 428/64.1; 428/64.4; 430/270.11; 269/133
(58) Field of Search ............... 428/64.1, 64.2, 428/64.4, 411.1, 913; 430/270.11, 495.1, 945; 264/1.33, 1.34

(56) References Cited

U.S. PATENT DOCUMENTS

| | | |
|---|---|---|
| 4,068,063 A | 1/1978 | Ikeda et al. |
| 5,106,920 A | 4/1992 | Murakami et al. |
| 5,164,469 A | 11/1992 | Goto et al. |
| 5,242,729 A * | 9/1993 | Hirata .......................... 428/64 |
| 5,244,706 A * | 9/1993 | Hirata .......................... 428/64 |
| 5,439,722 A | 8/1995 | Brekner et al. |
| 5,637,400 A | 6/1997 | Brekner et al. |
| 6,299,802 B1 * | 10/2001 | Parsons .................... 264/1.33 |

FOREIGN PATENT DOCUMENTS

| | | |
|---|---|---|
| EP | 0 325 260 | 7/1989 |
| JP | 9-324082 | 12/1997 |

* cited by examiner

*Primary Examiner*—Elizabeth Evans
(74) *Attorney, Agent, or Firm*—Oblon, Spivak, McClelland, Maier & Neustadt, P.C.

(57) ABSTRACT

Provided is an optical molding material comprising a cyclic polyolefin resin having a glass transition temperature (Tg) of 120° C. to 170° C., wherein the melt viscosity of the resin at 260° C. is 5,000 to 50,000 poises as measured at a shear rate of 10 sec$^{-1}$ and 200 to 1,000 poises at a shear rate of 10,000 sec$^{-1}$, and the melt viscosity of the resin at 320° C. is 500 to 5,000 poises at a shear rate of 10 sec$^{-1}$ and 100 to 800 poises at a shear rate of 10,000 sec$^{-1}$. An optical molding material comprising a cyclic polyolefin resin, an optical molded product and an optical disk substrate, wherein a variation range of retardation of the resin is within ±10% of the retardation at 590 nm when the wavelength is changed from 400 nm to 830 nm, are provided. The material is molded into, for example, the optical disk substrate. A method for producing an optical disk substrate comprises injection-molding a thermoplastic resin comprising a cyclic polyolefin resin under conditions of a resin temperature of (Tg+100)° C. to 400° C., a mold temperature of (Tg−100)° C. to (Tg−5)° C., a shear rate of $4 \times 10^4$ to $1 \times 10^6$ sec$^{-1}$ and average residence time of the resin in a molding machine of 5 to 200 seconds. The cyclic polyolefin resin is preferably composed of a norbornene derivative.

11 Claims, 1 Drawing Sheet

Dependence of retardation on wavelength

OPTICAL MOLDING MATERIAL, AND OPTICAL DISK SUBSTRATE AND PRODUCTION METHOD THEREOF

BACKGROUND OF THE INVENTION

1. Field of the Invention

The present invention relates to an optical molding material, and an optical disk substrate and a production method thereof, and more particularly to an optical molding material which is high in transfer accuracy and toughness, small in birefringence, particularly, birefringence occurred in a thicknesswise direction, good in optical disk properties and free of occurrence of silver streak, or to an optical molding material which is small in the variation range of retardation depending on light wavelength and good in optical properties when it is molded into an optical disk substrate by injection molding in particular, and also to an optical disk substrate making use of such a molding material, and further to a production method of an optical disk substrate which is free of occurrence of silver streak upon its production, high in transfer accuracy and toughness, small in warpage, narrow in scatter of birefringence properties, particularly, concyclic birefringence, and good in optical disk properties.

2. Description of the Background Art

In recent years, amorphous plastics including polycarbonate and polymethyl methacrylate have been utilized and applied in a field of optical disks such as compact disk (CD), CD-ROM, DVD and MO and optical materials for optical lenses, optical fibers, light guide plates, etc., and their various new uses have been investigated.

However, polycarbonate and the like is high in dependence of retardation (birefringence) on wavelength, and their molded products have small retardation at a specific wavelength, but become great in retardation in the case where light having any other wavelength is used. Therefore, such properties have been unsatisfactory as product characteristics required.

More specifically, optical instruments have currently taken striking strides. For example, drives capable of conducting recording and reproduction on plural optical disks (for example, 780 nm in the CD system and 650 nm in DVD system) different in wavelength of light used are going to come on the market. Further, in the next generation drives, the development of those capable of coping with blue laser of short wavelength (about 400 nm) are being advanced. Therefore, there is a demand in the market for development of optical molding materials stable in optical properties (retardation) over a wide wavelength range.

In the case of optical disks that information is read and written by using a fine laser beam, their product characteristics are greatly affected by differences in their optical properties. Therefore, when a great change is caused in retardation depending on wavelength used, production conditions corresponding to individual media must be newly preset. Accordingly, if a material exhibiting comparatively fixed retardation over a wide wavelength range is provided, great merits such as improvement in production efficiency would be obtained. Therefore, there is an increasing demand for development of such a material. In addition, an optical disk capable of reading and writing by a plurality of laser beams can also be developed, if retardation from a low wavelength to a high wavelength becomes stable. Therefore, they may become a material and optical disk for developing new technical fields.

On the other hand, cyclic polyolefin resins have such features that they have a high glass transition temperature owing to the stiffness of their main chain structure, are amorphous and high in light transmittance because a bulk group is present in the main chain structure, and exhibit low birefringence properties because they are small in anisotropy of polarizability, and attract attention as transparent thermoplastic resins excellent in heat resistance, transparency and optical properties.

Such cyclic polyolefin resins are disclosed in, for example, Japanese Patent Application Laid-Open Nos. 132625/1989, 132626/1989, 218726/1988, 133413/1990, 120816/1986 and 115912/1986.

In recent years, the cyclic polyolefin resins have been investigated in application thereof to fields such as various kinds of optical materials, and sealing materials such as sealants for optical semiconductors.

However, the cyclic polyolefin resins are comparatively low in toughness due to their bulky structure and hence cause burr by gate cutting and circumferential burr by handling and the like upon production of products such as optical disks and optical lenses, so that yield of such products may be lowered, or secondary processability thereof may be markedly inhibited.

On the other hand, in order to improve the toughness, it is considered to increase the molecular weight of a cyclic polyolefin resin. According to such a method, the toughness is improved, but the birefringence of molded products obtained from such a resin may become great to the contrary, so that the optical properties may be deteriorated to a marked extent.

It is generally conducted to control the molecular weight distribution for the purpose of balancing the toughness with the birefringence. In such a case, however, it has been relatively difficult to balance the toughness with the birefringence, and particularly, it has been difficult to obtain those small in birefringence in a thicknesswise direction or narrow in scatter of birefringence at concyclic positions (on a circumference of the same radius position), and further it has been considerably difficult to obtain a molded product having good optical disk properties with high yield because silver streak occurs on the surface of the molded product upon its production by injection molding or the like. In particular, a thin-wall molded product having a great surface area such as an optical disk is easy to cause silver streak, and it is difficult to reduce birefringence occurred upon the molding. In addition, since burr is easy to be formed upon gate cutting or handling, subsequent secondary processing for forming a metal film, organic film and/or the like involves a problem that the yield of the product is lowered.

In such an application field of optical disks, recording density of information has become high with the change of times, and so more improved optical properties have been required. Among these, there is great nee d to enlarge the numerical aperture of an objective lens due to the reduced diameter of a laser light spot used in reading and writing of information to an optical disk, and so great importance is attached to the influence of birefringence properties, particularly, birefringence in a thicknesswise direction or scatter of birefringence at concyclic positions on optical disks.

SUMMARY OF THE INVENTION

The present invention has been made on the basis of the foregoing circumstances.

It is the first object of the present invention to provide a molding material suitable for optical uses, or an optical molding material which is high in transfer accuracy and toughness, small in birefringence, particularly, birefringence occurred in a thicknesswise direction, good in optical disk properties and free of occurrence of silver streak when it is molded into an optical disk substrate by injection molding in particular, and an optical disk substrate made of the molding material.

The second object of the present invention is to provide a molding material suitable for optical uses, or an optical molding material which is high in transfer accuracy, narrow in concyclic scatter of retardation, small in the variation range of retardation in a wavelength range of from 400 nm to 830 nm in particular and good in optical properties in the above-described wide wavelength range when it is molded into an optical disk substrate by injection molding in particular, and an optical disk substrate made of the molding material.

The third object of the present invention is to provide a production method of an optical recording medium which is free of occurrence of silver streak upon its production, high in transfer accuracy and toughness, small in warpage, narrow in scatter of birefringence properties, particularly, concyclic birefringence, and good in optical disk properties.

According to the present invention, there is thus provided an optical molding material comprising a cyclic polyolefin resin having a glass transition temperature (Tg) not lower than 120° C., but not higher than 170° C., wherein the melt viscosity of the cyclic polyolefin resin at 260° C. is 5,000 to 50,000 poises as measured at a shear rate($\gamma$) of 10 sec$^{-1}$ and 200 to 1,000 poises as measured at a shear rate($\gamma$) of 10,000 sec$^{-1}$, and the melt viscosity of the cyclic polyolefin resin at 320° C. is 500 to 5,000 poises as measured at a shear rate($\gamma$) of 10 sec$^{-1}$ and 100 to 800 poises as measured at a shear rate($\gamma$) of 10,000 sec$^{-1}$.

According to the present invention, there is also provided an optical disk substrate obtained by molding the optical molding material described above, wherein the recording area portion of the optical disk substrate satisfies the following relationships:

$|Nx-Ny| \leq 0.0001$;

$|Nx-Nz| \leq 0.002$; and $|Ny-Nz| \leq 0.002$;

wherein Nx is a refractive index in a radial direction in the plane of the disk, Ny is a refractive index in a direction perpendicular to the radial direction in the same plane, and Nz is a refractive index in a direction perpendicular to the same plane.

According to the present invention, there is further provided an optical molding material comprising a cyclic polyolefin resin, wherein a variation range of retardation of the resin is within ±10% of the retardation at a wavelength of 590 nm when the wavelength of light is changed from 400 nm to 830 nm.

According to the present invention, there is still further provided an optical molded product obtained by molding a cyclic polyolefin resin, wherein a variation range of retardation of the molded product is within ±10% of the retardation at a wavelength of 590 nm when the wavelength of light is changed from 400 nm to 830 nm.

According to the present invention, there is yet still further provided an optical disk substrate obtained by molding a cyclic polyolefin resin, wherein a variation range of retardation of the optical disk substrate is within ±10% of the retardation at a wavelength of 590 nm when the wavelength of light is changed from 400 nm to 830 nm.

According to the present invention, there is yet still further provided a method for producing an optical disk substrate, which comprises injection-molding a thermoplastic resin comprising a cyclic polyolefin resin under conditions of a resin temperature of (Tg+100)° C. to 400° C. (Tg being a glass transition temperature of the thermoplastic resin; the same shall apply hereinafter), a mold temperature of (Tg−100)° C. to (Tg−5)° C., a shear rate of $4 \times 10^4$ to $1 \times 10^6$ sec$^{-1}$ and average residence time of the thermoplastic resin in a molding machine of 5 to 200 seconds.

In the above, the cyclic polyolefin resin may preferably be a specific cyclic polyolefin resin which is at least one selected from the group consisting of a ring-opening polymer of a monomer (hereinafter referred to as "specified monomer") represented by the general formula (I), which will be described subsequently, a ring-opening copolymer of the specified monomer and a copolymerizable monomer, hydrogenated polymers of these ring-opening polymer and ring-opening copolymer, and a saturated copolymer of the specified monomer and an unsaturated double bond-containing compound.

The optical molding materials according to the present invention are molding materials suitable for optical uses, are high in transfer accuracy and toughness, small in birefringence, particularly, birefringence occurred in a thicknesswise direction, good in optical disk properties and free of occurrence of silver streak when they are molded into optical disk substrates by injection molding in particular, and can provide product having such good properties at a high yield.

Therefore, the invention can contribute the enlargement of applications of the cyclic polyolefin resins in the field of optical materials, particularly, optical disks, which is of extremely high industrial value.

The optical molding materials according to the present invention are molding materials suitable for optical uses stable in optical properties (retardation), are high in transfer accuracy, narrow in concyclic scatter of retardation, small in variation range of retardation in a wavelength range of from 400 nm to 830 nm, i.e., at most ±10% of retardation at a wave length of 590 mm, and good in optical properties in the wide wavelength range, exhibit excellent optical disk properties, and can provide products having such good properties when they are molded into optical disk substrates by injection molding in particular. Therefore, when optical disk substrates different in wavelength used are molded, time and labor required for newly presetting production conditions corresponding to individual media are saved since the variation range of retardation due to change of wavelength is small, thereby achieving great force saving, such as more improved production efficiency. Further, the retardation from a low wavelength to a high wave length is stabilized, and so optical media capable of reading and writing by a plurality of lasers may also be developed, which is of extremely high industrial value in that they may be materials and optical disks for developing techniques in the next generation.

The production method of an optical recording medium according to the present invention provides an optical recording medium which is free of occurrence of silver streak upon its production, high in transfer accuracy and toughness, small in warpage, narrow in scatter of birefringence properties, particularly, concyclic birefringence, and good in optical disk properties. By this method, the invention can contribute the enlargement of applications of the cyclic polyolefin resins in the field of optical disks, and moreover can provide high-quality optical recording media, which is of extremely high industrial value.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE PREFERRED EMBODIMENTS

Figure 1:
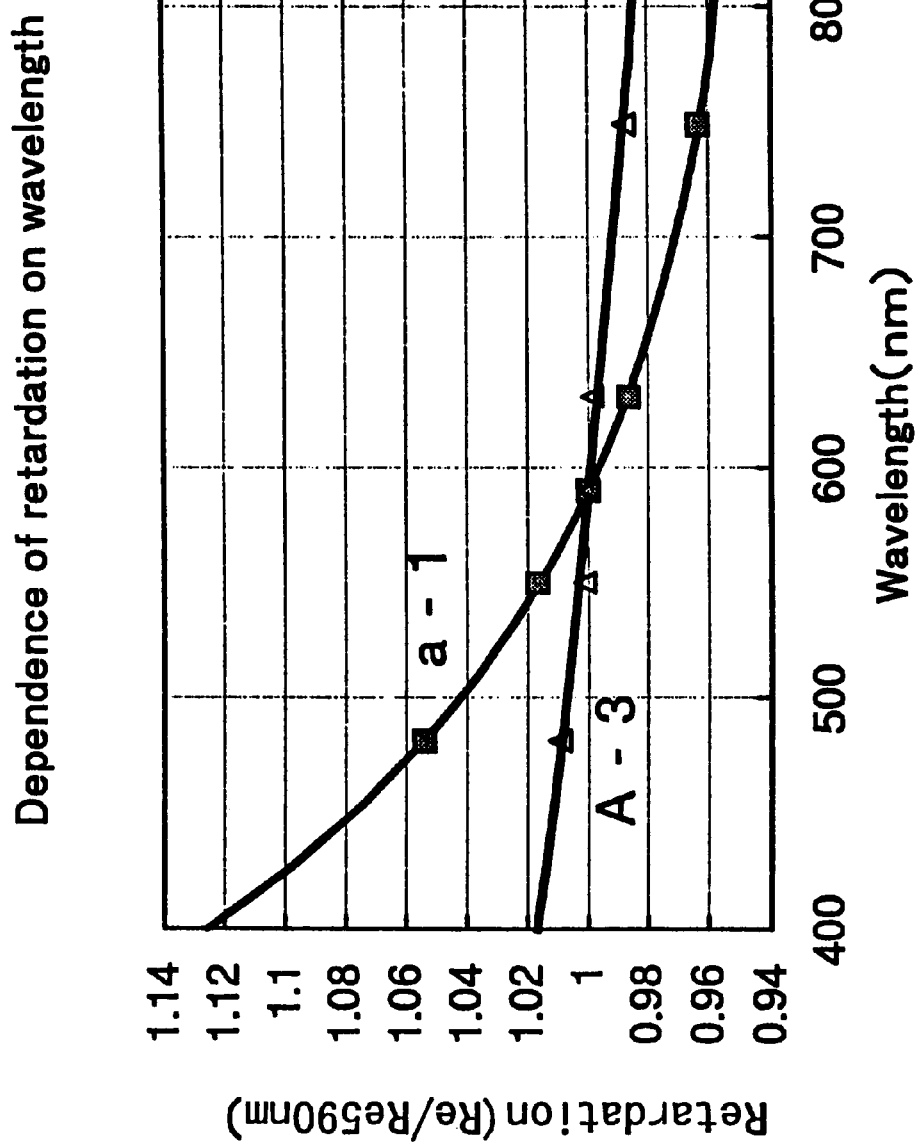
FIG. 1 diagrammatically illustrates the dependence of retardation on wavelength in an exemplary resin to be an optical molding material according to the present invention and an exemplary comparative resin.

Optical molding materials, and optical disk substrates and a production process thereof according to the present invention will hereinafter be described in detail.

<Optical Molding Material>

In the present invention, cyclic polyolefin-based thermoplastic resins making up the optical molding materials include the following polymers ① to ⑥:

① ring-opening polymers of monomers (specified monomers) represented by the following general formula (I);
② ring-opening copolymers of the specified monomer and a copolymerizable monomer;
③ hydrogenated polymers of ① the ring-opening polymers or ② the ring-opening copolymers;
④ (co)polymers obtained by cyclizing ① the ring-opening polymers or ② the ring-opening copolymers by a Friedel-Crafts reaction and then hydrogenating the resultant products;
⑤ saturated copolymers of the specified monomer and an unsaturated double bond-containing compound; and
⑥ addition polymers of at least one monomer selected from the group consisting of the specified monomers, vinyl cyclic hydrocarbon monomers and cyclopentadiene monomers, and hydrogenated polymers thereof.

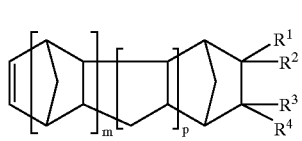

General formula (I)

wherein $R^1$ to $R^4$ are individually a hydrogen atom, a halogen atom, a hydrocarbon group having 1 to 10 carbon atoms or any other monovalent organic group and may be the same or different from one another, or $R^1$ and $R^2$ or $R^3$ and $R^4$ may form a divalent hydrocarbon group together with each other, or $R^1$ or $R^2$ and $R^3$ or $R^4$ may be bonded to each other to form a monocyclic or polycyclic structure, m is 0 or a positive integer, and p is 0 or a positive integer.

<Specified Monomer>

As preferable examples of the specified monomers, may be mentioned compounds in which $R^1$ and $R^3$ in the general formula (I) are individually a hydrogen atom or a hydrocarbon group having 1 to 10 carbon atoms, R and $R^4$ are individually a hydrogen atom or a monovalent organic group, at least one of $R^2$ and $R^4$ is another polar group than the hydrogen atom and hydrocarbon group, m is an integer of 0 to 3, p is an integer of 0 to 3, and a value of m+p is 0 to 4 (preferably 0 to 2, particularly preferably 1).

Among the specified monomers, specified monomers having a polar group represented by the formula $-(CH_2)_n COOR^5$ are preferred in that the resulting optical molding materials come to have a high glass transition temperature and low hygroscopicity. In the above formula relating to the polar group, $R^5$ is a hydrocarbon group having 1 to 12 carbon atoms, preferably an alkyl group, n is generally 0 to 5. However, n is preferably as small as possible because the glass transition temperature of the resulting optical molding material becomes higher. Further, the specified monomers in which n is 0 are preferred in that they are easy to be synthesized. In the general formula (I), $R^1$ or $R^3$ is preferably an alkyl group, and the number of carbon atoms in the alkyl group preferably 1 to 4, more preferably 1 or 2, particularly preferably 1. In particular, the alkyl group is preferably bonded to the same carbon atom to which the polar group represented by the formula $-(CH_2)_n COOR^5$ is bonded. The specified monomers in which m in the general formula (I) is 1 are preferred in that optical molding materials having a high glass transition temperature are obtained.

Specific examples of the specified monomers represented by the general formula (I) include the following compounds:

Bicyclo[2.2.1]hept-2-ene;
Tricyclo[5.2.1.0$^{2,6}$]-8-decene;
Tetracyclo[4.4.0.1$^{2,5}$.1$^{7,10}$]-3-dodecene;
Pentacyclo[6.5.1.1$^{3,6}$.0$^{2,7}$.0$^{9,13}$]-4-pentadecene;
Pentacyclo[7.4.0.1$^{2,5}$.1$^{9,12}$.0$^{8,13}$]-3-pentadecene;
Tricyclo[4.4.0.1$^{2,5}$]-3-undecene;
5-Methylbicyclo[2.2.1]hept-2-ene;
5-Ethylbicyclo[2.2.1]hept-2-ene;
5-Methoxycarbonylbicyclo[2.2.1]hept-2-ene;
5-Methyl-5-methoxycarbonylbicyclo[2.2.1]hept-2-ene;
5-Cyanobicyclo[2.2.1]hept-2-ene;
8-Methoxycarbonyltetracyclo[4.4.0.1$^{2,5}$.1$^{7,10}$]-3-dodecene;
8-Ethoxycarbonyltetracyclo[4.4.0.1$^{2,5}$.1$^{7,10}$-3-dodecene;
8-n-Propoxycarbonyltetracyclo[4.4.0.1$^{2,5}$.1$^{7,10}$]-3-dodecene;
8-Isopropoxycarbonyltetracyclo[4.4.0.1$^{2,5}$.1$^{7,10}$]-3-dodecene;
8-n-Butoxycarbonyltetracyclo[4.4.0.1$^{2,5}$.1$^{7,10}$]-3-dodecene;
8-Methyl-8-methoxycarbonyltetracyclo[4.4.0.1$^{2,5}$. 1$^{7,10}$]-3-dodecene;
8-Methyl-8-ethoxycarbonyltetracyclo[4.4.0.1$^{2,5}$. 1$^{7,10}$]-3-dodecene;
8-Methyl-8-n-propoxycarbonyltetracyclo[4.4.0.1$^{2,5}$. 1$^{7,10}$]-3-dodecene;
8-Methyl-8-isopropoxycarbonyltetracyclo[4.4.0.1$^{2,5}$. 1$^{7,10}$]-3-dodecene;
8-Methyl-8-n-butoxycarbonyltetracyclo[4.4.0.1$^{2,5}$. 1$^{7,10}$]-3-dodecene;
Dimethanooctahydronaphthalene;
Ethyltetracyclododecene;
6-Ethylidene-2-tetracyclododecene,
Trimethanooctahydronaphthalene;
Pentacyclo[8.4.0.1$^{2,5}$.1$^{9,12}$.0$^{8,13}$]-3-hexadecene;
Heptacyclo[8.7.0.1$^{3,6}$.1$^{10,17}$.1$^{12,15}$.0$^{2,7}$.0$^{11,16}$]-4-eicosene;
Heptacyclo[8.8.0.1$^{4,7}$.1$^{11,18}$.1$^{13,16}$.0$^{3,8}$.0$^{12,17}$]-5-heneicosene;
5-Ethylidenebicyclo[2.2.1]hept-2-ene;
8-Ethylidenetetracyclo[4.4.0.1$^{2,5}$.1$^{7,10}$ ]-3-dodecene;
5-Phenylbicyclo[2.2.1]hept-2-ene;
8-Phenyltetracyclo[4.4.0.1$^{2,5}$.1$^{7,10}$]-3-dodecene;

5-Fluorobicyclo[2.2.1]hept-2-ene;
5-Fluoromethylbicyco[2.2.1]hept-2-ene;
5-Trifluoromethylbicyclo[2.2.1]hept-2-ene;
5-Pentafluoroethylbicyclo[2.2.1]hept-2-ene;
5,5-Difluorobicyclo[2.2.1]hept-2-ene;
5,6-Difluorobicyclo[2.2.1]hept-2-ene;
5,5-Bis(trifluoromethyl)bicyclo[2.2.1]hept-2-ene;
5,6-Bis(trifluoromethyl)bicyclo[2.2.1]hept-2-ene;
5-Methyl-5-trifluoromethylbicyclo[2.2.1]hept-2-ene;
5,5,6-Trifluorobicyclo[2.2.1]hept-2-ene;
5,5,6-Tris(fluoromethyl)bicyclo[2.2.1]hept-2-ene;
5,5,6,6-Tetrafluorobicyclo[2.2.1]hept-2-ene;
5,5,6,6-Tetrakis(trifluoromethyl)bicyclo[2.2.1]-hept-2-ene;
5,5-Difluoro-6,6-bis(trifluoromethyl)bicyclo-[2.2.1]hept-2-ene;
5,6-Difluoro-5,6-bis(trifluoromethyl)bicyclo-[2.2.1]hept-2-ene;
5,5,6-Trifluoro-5-trifluoromethylbicyclo[2.2.1]-hept-2-ene;
5-Fluoro-5-pentafluoroethyl-6,6-bis(trifluoro-methyl)bicyclo[2.2.1]hept-2-ene;
5,6-Difluoro-5-heptafluoroisopropyl-6-trifluoro-methylbicyclo[2.2.1]hept-2-ene;
5-Chloro-5,6,6-trifluorobicyclo[2.2.1]hept-2-ene;
5,6-Dichloro-5,6-bis(trifluoromethyl)bicyclo-[2.2.1]hept-2-ene;
5,5,6-Trifluoro-6-trifluoromethoxybicyclo[2.2.1]-hept-2-ene;
5,5,6-Trifluoro-6-heptafluoropropoxybicyclo-[2.2.1]hept-2-ene;
8-Fluorotetracyclo[4.4.0.1$^{2,5}$.1$^{7,10}$]-3-dodecene;
8-Fluoromethyltetracycio[4.4.0.1$^{2,5}$.1$^{7,10}$]-3-dodecene;
8-Difluoromethyltetracyclo[4.4.0.1$^{2,5}$.1$^{7,10}$]-3-dodecene;
8-Trifluoromethyltetracyclo[4.4.0.1$^{2,5}$.1$^{7,10}$]-3-dodecene;
8-Pentafluoromethyltetracyclo[4.4.0.1$^{2,5}$.1$^{7,10}$]-3-dodecane;
8,8-Difluorotetracyclo[4.4.0.1$^{2,5}$.1$^{7,10}$]-3-dodecene;
8,9-Difluorotetracyclo[4.4.0.1$^{2,5}$.1$^{7,10}$]-3-dodecene;
8,8-Bis(trifluoromethyl)tetracyclo[4.4.0.1$^{2,5}$.1$^{7,10}$]-3-dodecene;
8,9-Bis(trifluoromethyl)tetracyclo[4.4.0.1$^{2,5}$.1$^{7,10}$]-3-dodecene;
8-Methyl-8-trifluoromethyltetracyclo[4.4.0.1$^{2,5}$.1$^{2,5}$.1$^{7,10}$]-3-dodecene;
8,8,9-Trifluorotetracyclo[4.4.0.1$^{2,5}$.1$^{7,10}$]-3-dodecene;
8,8,9-Tris(trifluoromethyl)tetracyclo[4.4.0.1$^{2,5}$.1$^{7,10}$]-3-dodecene;
8,8,9,9-Tetrafluorotetracyclo[4.4.0.1$^{2,5}$.1$^{7,10}$]-3-dodecene;
8,8,9,9-Tetrakis(trifluoromethyl)tetracyclo-[4.4.0.1$^{2,5}$.1$^{7,10}$]-3-dodecene;
8,8-Difluoro-9,9-bis(trifluoromethyl)tetracyclo-[4.4.0.1$^{2,5}$.1$^{7,10}$]-3-dodecene;
8,9-Difluoro-8,9-bis(trifluoromethyl)tetracyclo-[4.4.0.1$^{2,5}$.1$^{7,10}$]-3-dodecene;
8,8,9-Trifluoro-9-trifluoromnethyltetracyclo-[4.4.0.1$^{2,5}$.1$^{7,10}$]-3-dodecene;
8,8,9-Trifluoro-9-trifluoromethoxytetracyclo-[4.4.0.1$^{2,5}$.1$^{7,10}$]-3-dodecene;
8,8,9-Trifluoro-9-pentafluoropropoxytetracyclo-[4.4.0.1$^{2,5}$.1$^{7,10}$]-3-dodecene;
8-Fluoro-8-pentafluoroethyl-9,9-bis(trifluoromethyl)tetracyclo[4.4.0.1$^{2,5}$.1$^{7,10}$]-3-dodecene;
8,9-Difluoro-8-heptafluoroisopropyl-9-trifluoro-methyltetracyclo[4.4.0.1$^{2,5}$.1$^{7,10}$]-3-dodecene;
8-Chloro-8,9,9-trifluorotetracyclo-[4.4.0.1$^{2,5}$.1$^{7,10}$]-3-dodecene;
8,9-Dichloro-8,9-bis(trifluoromethyl)tetracyclo-[4.4.0.1$^{2,5}$.1$^{7,10}$]-3-dodecene;
8-(2,2,2-trifluoroethoxycarbonyl)tetracyclo-[4.4.0.1$^{2,5}$.1$^{7,10}$]-3-dodecene; and
8-Methyl-8-(2,2,2-trifluoroethoxycarbonyl)-tetracyclo [4.4.0.1$^{2,5}$.1$^{7,10}$]-3-dodecene.

Among these specified monomers, 8-methyl-8-methoxycarbonyltetracyclo[4.4.0.1$^{2,5}$.1$^{7,10}$]-3-dodecene, 8-ethylidenetetracyclo[4.4.0.1$^{2,5}$.1$^{7,10}$]-3-dodecene, 8-ethyl-tetracyclo[4.4.0.1$^{2,5}$.1$^{7,10}$]-3-dodecene and pentacyclo-[7.4.0.1$^{2,5}$.1$^{9,12}$.0$^{8,13}$]-3-pentadecene (these compounds will hereinafter be referred to as "specified monomers A") are preferred in that they finally provide optical molding materials and optical disk substrates excellent in optical properties, molding and processing ability, heat resistance, adhesion to recording film and birefringence properties.

On the other hand, ring-opening copolymers obtained by subjecting at least one of bicyclo[2.2.1]hept-2-ene, 5-methylbicyclo[2.2.1]hept-2-ene, 5-ethylbicyclo[2.2.1]hept-2-ene, 5-methoxycarbonylbicyclo[2.2.1]hept-2-ene, 5-methyl-5-methoxycarbonylbicyclo[2.2.1]hept-2-ene, 5-ethylidenebicyclo[2.2.1]-hept-2-ene and 5-phenylbicyclo[2.2.1]hept-2-ene (these compounds will hereinafter be referred to as "specified monomers B") among the above-mentioned specified monomers to ring-opening copolymerization with at least one of the specified monomers A are preferred in that they finally provide optical disk substrates far excellent in optical properties, toughness, molding geometry and transfer accuracy and that their birefringence properties, particularly, scatter of concyclic birefringence becomes small. In this case, the specified monomer A and the specified monomer B are used in such proportions that "the specified monomer A to the specified monomer B" is preferably 100/0 to 50/50, more preferably 100/0 to 60/40, most preferably 100/0 to 70/30 in terms of a weight ratio.

<Copolymerizable Monomer>

In the ring-opening polymerization step for obtaining the cyclic polyolefin resins according to the present invention, the specified monomer may be subjected to ring-opening polymerization singly. However, the specified monomer and a copolymerizable monomer may be subject to ring-opening copolymerization.

As specific examples of the copolymerizable monomer used in this case, may be mentioned cycloolefine such as cyclobutene, cyclopentene, cycloheptene, cyclooctene, tricyclo[5.2.1.0$^{2,6}$]-3-decene, 5-ethylidene-2-norbornene and dicyclopentadiene. The number of carbon atoms in the cycloolefins is preferably 4 to 20, more preferably 5 to 12.

The specified monomer may be subjected to ring-opening polymerization in the presence of an unsaturated hydrocarbon polymer containing a carbon-carbon double bond in its main chain, such as polybutadiene, polyisoprene, a styrene-butadiene copolymer, an ethylene-nonconjugated diene copolymer or polynorbornene. A ring-opening copolymer obtained in this case may be used as it is. However, a hydrogenated product obtained by further hydrogenating this copolymer is useful as a raw material for resins high in impact resistance.

These copolymerizable monomers are used in such a proportion that "the specified monomer to the copolymerizable monomer" is preferably 100/0 to 50/50, more preferably 100/0 to 60/40 in terms of a weight ratio.

A hydrogenated product of a ring-opening polymer obtained in this case is useful as a raw material for resins high in impact resistance.

<Ring-opening Polymerization Catalyst>

The ring-opening polymerization reactions are conducted in the presence of a metathesis catalyst.

The metathesis catalyst is a catalyst composed of a combination of (a) at least one selected from the group consisting of compounds of W, Mo and Re, and (b) at least one selected from the group consisting of compounds of Group IA elements (for example, Li, Na, K, etc.), Group IIA elements (for example, Mg, Ca, etc.), Group IIB elements (for example, Zn, Cd, Hg, etc.), Group IIIB elements (for example, B, Al, etc.), Group IVA elements (for example, Ti, Zr, etc.) and Group IVB elements (for example, Si, Sn, Pb, etc.) of the Deming's periodic table, said compounds each having at least one said element-carbon bond or said element-hydrogen bond. In this case, an additive (c), which will be described subsequently, may be added to this catalyst in order to enhance catalytic activity.

As typical examples of the compound of W, Mo or Re suitable for the component (a), may be mentioned compounds described in Japanese Patent Application Laid-Open No. 240517/1989, such as $WCl_6$, $MoCl_5$ and $ReOCl_3$.

As typical examples of the component (b), may be mentioned compounds described in Japanese Patent Application Laid-Open No. 240517/1989, such as n-$C_4H_9Li$, $(C_2H_5)_3Al$, $(C_2H_5)_2AlCl$, $(C_2H_5)_{1.5}AlCl_{1.5}$, $(C_2H_5)AlCl_2$, methylalmoxane and LiH.

As typical example of the component (c) which is an additive, alcohols, aldehydes, ketones, amines, etc. may be suitably used. Further, compounds described in Japanese Patent Application Laid-Open No. 240517/1989 may also be used.

The amount of the metathesis catalyst used is within such a range that "the component (a) to the specified monomer" is generally 1:500 to 1:50,000, preferably 1:1,000 to 1:10,000 in terms of a molar ratio of the component (a) to the specified monomer.

A proportion of the component (a) to the component (b) is within such a range that "(a) to (b)" 1:1 is 1:1 to 1:50, preferably 1:2 to 1:30 in terms of a metal atom ratio.

A proportion of the component (a) to the component (c) is within such a range that "(c) to (a)" is 0.005:1 to 15:1, preferably 0.05:1 to 7:1 in terms of a molar ratio.

<Molecular Weight Modifier>

The regulation of the molecular weight of the ring-opening polymer may be conducted by polymerization temperature, the kind of a catalyst used and the kind of a solvent used. In the present invention, however, it is preferred that the molecular weight be regulated by causing a molecular weight modifier to coexist in the reaction system.

As preferable examples of the molecular weight modifier, may be mentioned α-olefins such as ethylene, propene, 1-butene, 1-pentene, 1-hexene, 1-heptene, 1-octene, 1-nonene and 1-decene, and styrene. Among these, 1-butene and 1-hexene are particularly preferred.

These molecular weight modifiers may be used either singly or in any combination thereof.

The amount of the molecular weight modifier used is 0.005 to 0.6 mol, preferably 0.02 to 0.5 mol per mol of the specified monomer used in the ring-opening polymerization reaction.

<Solvent for Ring-opening Polymerization Reaction>

As examples of a solvent used in the ring-opening polymerization reaction, i.e., a solvent dissolving the specified monomer, metathesis catalyst and molecular weight modifier used therein, may be mentioned alkanes such as pentane, hexane, heptane, octane, nonane and decane; cycloalkanes such as cyclohexane, cycloheptane, cyclooctane, decaline and norbornane; aromatic hydrocarbons such as benzene, toluene, xylene, ethylbenzene and cumene; halogenated alkanes such as chlorobutane, bromohexane, methylene chloride, dichloroethane, hexamethylene dibromide, chlorobenzene, chloroform and tetrachloroethylene; allyl compounds; esters of saturated carboxylic acids, such as ethyl acetate, n-butyl acetate, isobutyl acetate, methyl propionate; and ethers such as dibutyl ether, tetrahydrofuran and dimethoxyethane. These solvents may be used either singly or in any combination thereof. Among these, the aromatic hydrocarbons are preferred.

The amount of the solvent used is such an amount that "the solvent to the specified monomer" is generally 1:1 to 10:1, preferably 1:1 to 5:1 in terms of a weight ratio.

<Hydrogenation Catalyst>

The ring-opening (co)polymer obtained in the above-described manner may also be used as an optical molding material as it is. However, it is preferred to use a hydrogenated (co)polymer obtained by hydrogenating such a (co)polymer as the cyclic polyolefin resin according to the present invention for reasons of its heat stability and optical properties.

The hydrogenation reaction is conducted in accordance with a method known per se in the art, namely, by adding the hydrogenation catalyst to a solution of the ring-opening (co)polymer and causing hydrogen gas of ordinary pressure to 300 atm, preferably 3 to 200 atm to act on the solution at 0 to 200° C., preferably 20 to 180° C.

As the hydrogenation catalyst, that used in an ordinary hydrogenation reaction of an olefin compound may be used. As examples of the hydrogenation catalyst, heterogeneous catalysts and homogeneous catalysts are publicly known.

As examples of the heterogeneous catalysts, may be mentioned solid catalysts with-a noble metal catalytic substance such as palladium, platinum, nickel, rhodium or ruthenium carried on a support such as carbon, silica, alumina or titania. As examples of the homogeneous catalysts, may be mentioned nickel naphthenate/triethylaluminum, nickel acetylacetonate/triethylaluminum cobalt octenoate/n-butyllithium, titanocene ichloride/diethylaluminum rnonochloride, rhodium acetate, hlorotris (triphenylphosphine)-rhodium, dichlorotris-(triphenylphosphine)-ruthenium, chlorohydrocarbonyltris-(triphenylphosphine)-ruthenium and dichlorocarbonyltris-(triphenylphosphine)-ruthenium. The catalyst may be in the form of either powder or granules.

The hydrogenation catalyst is used in such a proportion that "the ring-opening (co)polymer to the hydrogenation catalyst" is $1:1\times10^{-6}$ to 1:2 in terms of a weight ratio.

The hydrogenated (co)polymer obtained by the hydrogenation in such a manner has excellent heat stability, and so its properties are not deteriorated by heating upon molding and processing or use as a product. The rate of hydrogenation of the product is generally at least 50%, preferably at least 70%, more preferably at least 90%, most preferably at least 95%.

<Unsaturated Double Bond-containing Compound Making up Saturated Copolymer>

As examples of an unsaturated double bond-containing compound used in a copolymerization reaction with the specified monomer for the purpose of obtaining the cyclic polyolefin resin composed of a saturated copolymer, may be mentioned olefin compounds having, preferably, 2 to 12 carbon atoms, more preferably, 2 to 8 carbon atoms, such as ethylene, propylene and butene.

The unsaturated double bond-containing compound is sed in such a proportion that "the specified monomer to the unsaturated double bond-containing compound" is referably 90:10 to 40:60, more preferably 85:15 to 50:50 in terms of a weight ratio.

<Catalyst Used in Obtaining Saturated Copolymer>

As a catalyst used in the copolymerization reaction of the specified monomer and the unsaturated double bond-containing compound, a catalyst composed of a vanadium compound and an organic aluminum compound is used. As the vanadium compound, a vanadium compound represented by the general formula $VO(OR)_aX_b$ or $V(OR)_cX_d$ (wherein R: a hydrocarbon group, $0 \leq a \leq 3$, $0 \leq b \leq 3$, $2 \leq a+b \leq 3$, $0 \leq c \leq 4$, $0 \leq d \leq 4$, $3 \leq c+d \leq 4$), or an electron donor adduct thereof is used. Examples of the electron donor include oxygen-containing electron donors such as alcohols, phenols, ketones, aldehydes, carboxylic acids, esters of organic or inorganic acids, ethers, acid amides, acid anhydrides and alkoxysilanes, and nitrogen-containing electron donors such as ammonia, amines, nitrites and isocyanates. As the organic aluminum compound catalyst component, at least one selected from the group consisting of compounds each having at least one aluminum-carbon bond or aluminum-hydrogen bond is used.

A ratio between the catalyst components is at least 2, preferably 2 to 50, particularly preferably 3 to 20 in terms of an atomic ratio (Al/V) of aluminum atom to vanadium atom.

<Solvent Used in Obtaining Saturated Copolymer>

As examples of a solvent used in the copolymerization reaction of the specified monomer and the unsaturated double bond-containing compound, may be mentioned alkanes such as pentane, hexane, heptane, octane, nonane and decane; cycloalkanes such as cyclohexane and methylcyclohexane; aromatic hydrocarbons such as benzene, toluene and xylene; and halogenated derivatives thereof. Among these, cyclohexane is preferred.

<Cyclopentadiene Monomer>

Examples of the cyclopentadiene monomer used as a monomer for the above-described addition polymers include cyclopentadiene, 1-methylcyclopentadiene, 2-methylcyclopentadiene, 2-ethylcyclopentadiene, 5-methyl-cyclopentadiene and 5,5-dimethylcyclopentadiene.

<Vinyl Cyclic Hydrocarbon Monomer>

Examples of the vinyl cyclic hydrocarbon monomer used as a monomer for the above-described addition polymers include vinylated 5-membered ring hydrocarbon monomers such as vinylcyclopentene monomers such as 4-vinylcyclopentene and 2-methyl-4-isopropenylcyclopentene, and vinylcyclopentane monomers such as 4-vinylcyclopentane and 4-isopropenylcyclopentane;

vinylcyclohexene monomers such as 4-vinylcyclohexene, 4-isopropenylcyclohexene, 1-methyl-4-isopropenylcyclohexene, 2-methyl-4-vinylcyclohexene and 2-methyl-4-isopropenylcyclohexene; vinylcyclohexane monomers such as 4-vinylcyclohexane and 2-methyl-4-isopropenyl-cyclohexane; styrene monomers such as styrene, α-methyl-styrene, 2-methylstyrene, 3-methylstyrene, 4-methyl-styrene, 1-vinylnaphthalene, 2-vinylnaphthalene, 4-phenylstyrene and p-methoxystyrene; terpene monomers such as d-terpene, 1-terpene, diterpene, d-limonene, 1-limonene and dipentene; vinylcycloheptene monomers such as 4-vinyl- cycloheptene and 4-isopropenylcycloheptene; and vinylcycloheptane monomers such as 4-vinylcycloheptane and 4-isopropenylcycloheptane.

<Inherent Viscosity>

The inherent viscosity (ηinh) of the cyclic polyolefin resin used in the present invention as measured at 30° C. in chloroform is preferably 0.2 to 5.0 dl/g, more preferably 0.3 to 3.0 dl/g, particularly preferably 0.4 to 1.0 dl/g, most preferably 0.4 to 0.7 dl/g. By controlling the inherent viscosity (ηinh) within this range, the cyclic polyolefin resin can be provided as a polymer by which the toughness, molding geometry and birefringence properties or retardation properties of the finally resulting optical disk substrate are still more improved.

<Molecular Weight>

With respect to the molecular weight of the cyclic polyolefin resin according to the present invention, the number average molecular weight (Mn) in terms of polystyrene as measured by gel permeation chromatography (GPC) analysis is preferably not lower than 10,000, but not higher than 50,000, more preferably not lower than 12,000, but not higher than 30,000, particularly preferably not lower than 15,000, but not higher than 25,000, the weight average molecular weight (Mw) is preferably not lower than 20,000, but not higher than 250,000, more preferably not lower than 24,000, but not higher than 150,000, particularly preferably not lower than 30,000, but not higher than 125,000, the molecular weight distribution (Mw/Mn) thereof is preferably not smaller than 2.0, but not greater than 5.0, more preferably not smaller than 2.5, but not greater than 5.0, particularly preferably greater than 2.5, but not greater than 4.0, a proportion of a component having a molecular weight not higher than 5,000 is preferably at most 15%, more preferably at most 10%, particularly preferably at most 5%, and a proportion of a component having a molecular weight not lower than 300,000 is preferably at most 15%, more preferably at most 10%, particularly preferably at most 5%. The respective proportions herein correspond to chart areas (integrated value) when the molecular weight is plotted on the axis of abscissa in a GPC measurement chart.

It is preferred that Mn and Mw are controlled within the above respective ranges, since a molded product high in toughness and sufficient in strength is provided, and moreover the birefringence (retardation) thereof becomes small to achieve good optical properties.

In addition, it is preferred that the molecular weight distribution (Mw/Mn) be controlled within the above range, since an optical disk substrate high in toughness and sufficient in strength is provided with ease, and moreover the birefringence (retardation) thereof becomes still smaller to achieve good optical properties.

It is not preferred that the proportion of the component having a molecular weight not higher than 5,000 exceeds 15% because the toughness is deteriorated, and moreover said component deposits within a mold during continuous molding to deteriorate product characteristics, and that the proportion of the component having a molecular weight not lower than 300,000 exceeds 15% because the birefringence, particularly, birefringence in a thicknesswise direction, of the resulting molded product becomes great.

In the ring-opening copolymer of the specified monomer A and the specified monomer B in particular, a good optical molding material, or a cyclic polyolefin resin which can provide molded products, optical disks and optical parts still lower in the dependence of birefringence in the thicknesswise direction or retardation (birefringence) on light wavelength is provided by controlling Mn, Mw and Mw/Mn within the above respective ranges, thereby providing optical disk substrates and optical recording media still narrower in scatter of concyclic birefringence.

<Glass Transition Temperature (Tg)>

The glass transition temperature (Tg) of the cyclic polyolefin resin according to the present invention is not lower than 100° C., but not higher than 200° C., preferably not lower than 120° C., but not higher than 170° C., more preferably not lower than 125° C., but not higher than 160° C., particularly preferably not lower than 130° C., but not higher than 150° C. If Tg is lower than the lower limit of the above range, no molded product having sufficient heat resistance cannot be provided. If Tg is higher than the upper limit of the above range on the other hand, the molding and processing ability of the resulting optical molding material is markedly deteriorated.

In the ring-opening copolymer of the specified monomer A and the specified monomer B in particular, a good cyclic polyolefin resin which is well balanced between toughness and moldability and can provide molded products still lower in birefringence, particularly, birefringence in the thicknesswise direction, or retardation on light wavelength and still narrower in scatter of concyclic birefringence is provided by controlling Tg within the above range by changing the compositional ratio therebetween.

<Melt Viscosity>

The optical molding material according to the present invention comprises a cyclic polyolefin resin, wherein the melt viscosity of the cyclic polyolefin resin at 260° C. is 5,000 to 50,000 poises as measured at a shear rate($\gamma$) of 10 $\sec^{-1}$ and 200 to 1,000 poises as measured at a shear rate($\gamma$) of 10,000 $\sec^{-1}$, and the melt viscosity of the cyclic polyolefin resin at 320° C. is 500 to 5,000 poises as measured at a shear rate($\gamma$) of 10 $\sec^{-1}$ and 100 to 800 poises as measured at a shear rate($\gamma$) of 10,000 $\sec^{-1}$. preferably, the melt viscosity at 260° C. is 8,000 to 30,000 poises as measured at a shear rate($\gamma$) of 10 $\sec^{-1}$ and 300 to 800 poises as measured at a shear rate($\gamma$) of 10,000 $\sec^{-1}$, and the melt viscosity at 320° C. is 800 to 3,000 poises as measured at a shear rate($\gamma$) of 10 $\sec^{-1}$ and 100 to 500 poises as measured at a shear rate($\gamma$) of 10,000 $\sec^{-1}$.

It the above respective temperatures, the melt viscosities at both low shear rate and high shear rate are controlled within the above respective ranges, whereby molded products good in molding geometry, high in toughness and small in birefringence, particularly, birefringence in the thicknesswise direction can be provided. If the melt viscosity as measured at the shear rate($\gamma$) of 10 $\sec^{-1}$ that is in a low shear rate region is lower than the lower limit of the above respective ranges, the toughness of the resulting molded product is deteriorated, and crack, burr and the like are caused upon molding to lower the yield. If the melt viscosity at said shear rate exceeds the upper limit of the above respective ranges, the moldability of the resulting optical molding material is deteriorated, and birefringence, particularly, birefringence in the thicknesswise direction, of the resulting molded product becomes great. If the melt viscosity as measured at the shear rate($\gamma$) of 10,000 $\sec^{-1}$ that is in a high shear rate region is lower than the lower limit of the above respective ranges, scatter of shot upon molding become wide due to high dependence of melt viscosity on shear rate, resulting in the difficulty of conducting stable molding. If the melt viscosity at said shear rate exceeds the upper limit of the above respective ranges, birefringence, particularly, birefringence in the thicknesswise direction, of the resulting molded product becomes great.

The control of the melt viscosity of the cyclic polyolefin resin within the above respective ranges can be achieved by selecting the kind of the above monomer or the combination of the monomers, respectively adjusting the inherent viscosity, molecular weight and glass transition temperature of the resulting polymer and suitably balancing these physical properties with one another.

The gel content in the cyclic polyolefin resin used in the present invention is preferably at most 0.1% by weight, more preferably at most 0.05% by weight, particularly preferably at most 0.01% by weight, most preferably at most 0.001% by weight. If the gel content is higher than the upper limit of the above range, the resulting optical molding material tends to cause silver streak upon molding. The gel content is controlled within the above range, whereby the occurrence of silver streak upon molding can be prevented to provide a product at a high yield.

As a method for obtaining a cyclic polyolefin resin having such a low gel content, any publicly known method may be used. As examples thereof, may be mentioned the following methods.

① A method in which a finishing step upon the production of the cyclic polyolefin resin, for example, a step of pelletizing the resin by removal of a solvent and heating, is conducted throughout in an atmosphere of an inert gas such as nitrogen or argon.

② A method in which a proper antioxidant is added, for example, after a hydrogenating step upon the production.

③ A method in which the temperature at a finishing step upon the production is lowered as much as possible.

④ A method in which gel is removed by filtration making use of, for example, a microfilter having a pore size of 0.5 to 1 $\mu$m when gel has been formed even by the methods ① to ③, or none of these methods have been conducted.

In order to obtain a cyclic polyolefin resin having a low gel content, one of the above-described methods may be practiced, or a combination thereof may be used.

The content of a volatile component which is volatilized by heating in the optical molding material according to the present invention is desirably controlled to preferably at most 0.3% by weight, more preferably at most 0.1% by weight, most preferably at most 0.05% by weight in terms of a weight change by heating the material to 360° C. that is a substantial molding temperature after drying the material for molding. The content of the volatile component is controlled within the above range, whereby silver streak is harder to occur.

The cyclic polyolefin resins according to the present invention may comprise a hydrocarbon resin, polystyrene oligomer or rosin resin as a resin component other than the above-described resins. The flowability and other properties of the resulting resin composition are improved by these resin components.

The content of the other resin component is generally 0.01 to 60 parts by weight, preferably 0.1 to 30 parts by weight, more preferably 0.2 to 20 parts by weight per 100 parts by weight of the cyclic polyolefin resin.

The other resin component is preferably solid at ordinary temperature and has a weight average molecular weight (Mw) of at most 20,000, preferably 200 to 20,000 in terms of polystyrene.

If the weight average molecular weight in terms of polystyrene is too high, its compatibility with the cyclic polyolefin resin becomes poor, and the transparency of the resulting resin composition is deteriorated. It is not preferable that the molecular weight is such high. If a hydrocarbon resin that is liquid at normal temperature is used, the mechanical strength of the resulting resin composition is deteriorated, and such a resin bleeds out on the surface of a molded product obtained from such a resin composition. It is not preferable to. use such a liquid resin.

As examples of such a hydrocarbon resin, may be mentioned C-5 hydrocarbon resins (petroleum resins comprising hydrocarbons having 5 carbon atoms as a main component), C-9 hydrocarbon resins (petroleum resins comprising hydrocarbons having 9 carbon atoms as a main component), C-5/C-9 mixed hydrocarbon resins (petroleum resins), cyclopentadiene resins, resins comprising a polymer of a vinyl-substituted aromatic compound, resins comprising an olefin/vinyl-substituted aromatic compound copolymer, resins comprising a cyclopentadiene compound/vinyl-substituted aromatic compound copolymer, and hydrogenated products of the above resins.

Examples of the rosin resin include abietic acid, pimaric acid, and derivatives thereof, such as hydrogenated products, disproportionated products, polymers and esterified products.

In the cyclic polyolefin resin according to the present invention, fillers such as glass fiber, carbon fiber, metal fiber, metal flake, glass beads, waltherite, rock filler, calcium carbonate, talc, silica, mica, glass flake, mild fiber, kaolin, barium sulfate, graphite, molybdenum disulfide, magnesium oxide, zinc oxide whisker and potassium titanate whisker may be used either singly or in any combination thereof for the purpose of improving the mechanical properties of the resin.

Into the cyclic polyolefin resin according to the present invention, publicly known additives such as flame retardants, antibacterial agents, wood meal, coupling agents, antioxidants, plasticizers, colorants, lubricants, silicone oil and foaming agents may also be incorporated.

In the case where the above-described other resin components, fillers, additives, etc. are incorporated into the cyclic polyolefin resin according to the present invention, any publicly known method may be used. As examples thereof, may be mentioned:

① a method in which the respective components are mixed by means of a twin-screw extruder, roll kneader or the like to obtain a resin composition in the form of pellets; and ② a method in which the respective components are mixed in a state of a solution, and the solvent is removed, thereby obtaining a resin composition.

In the preparation method ①, a melt kneader such as Banbury mixer, kneader, roll or feeder loader may be used.

The kneading temperature is preferably 100 to 350° C., more preferably 150 to 300° C. In the kneading of the respective components, the respective components may be kneaded either collectively or while adding them in portions.

<Optical Disk Substrate>

The optical molding material according to the present invention can be formed into molded products by means of a publicly known means, for example, injection molding, compression molding, extrusion or the like. However, the molding material is suitable for use in production of transparent substrates such as optical disk substrates by preferably injection molding, particularly injection compression molding.

A recording layer or a metal layer for reflecting a laser beam is then formed on the optical disk substrate obtained by injection molding, particularly preferably injection compression molding, in accordance with a method known per se in the art, such as vapor deposition or sputtering, and a protective layer is further provided as needed, thereby forming an optical disk. More specifically, the optical molding material is injected into a mold equipped with a stamper having irregularities corresponding to information pits, and an optical disk substrate thus obtained is coated with a metal having a high reflectance, for example, Ni, Al or Au. Further, an ultraviolet ray-curable resin such as a publicly known acrylic resin, or the like is applied on to the metal layer and cured for the purpose of protecting it, thereby producing a reproduction-only disk such as CD or LD, from which information is read out utilizing reflection of a laser beam. In addition, a cyanine type or phthalocyanine type organic pigment is applied on to an optical disk substrate provided with guide grooves of, for example, at most 1 μm, thereby obtaining an additionally writable type CD-R, DVD-R or the like, in which information is stored by irradiation of a laser beam. Further, a rewritable type disk utilizing a phenomenon that light reflectance or light transmittance is changed due to a phase change of non-crystal-crystal by irradiation of a laser beam like in a recording layer of As—Te—Ge system, or a phenomenon that reversal of magnetization is caused by irradiation of a laser beam like in a recording layer of amorphous rare earth-transition metal alloy film typified by Tb—Fe—Co may also be produced.

The optical disk substrate according to the present invention is obtained by molding the optical molding material and preferably has a feature that the recording area portion of the optical disk substrate satisfies the following relationships:

$|Nx-Ny| \leq 0.0001;$ $|Nx-Nz| \leq 0.002;$ and $|Ny-Nz| \leq 0.002;$ wherein Nx is a refractive index in a radial direction in the plane of the disk, Ny is a refractive index in a direction perpendicular to the radial direction in the same plane, and Nz is a refractive index in a direction perpendicular to the same plane.

In the above relationships, preference is given to $|Nx-Ny| \leq 0.00005$, $|Nx-Nz| \leq 0.001$ and $|Ny-Nz| \leq 0.001$, a further preference is given to $|Nx-Ny| \leq 0.00003$, $|Nx-Nz| \leq 0.0005$ and $|Ny-Nz| \leq 0.005$, and a marked preference is given to $|Nx-Ny| \leq 0.00002$, $|Nx-Nz| \leq 0.0004$ and $|Ny-Nz| \leq 0.0004$.

Differences among refractive indexes are controlled within the above respective ranges as described above, whereby the resulting optical disk substrate can be provided as a substrate good in optical disk properties. In a high-density optical disk in particular, it is conducted to enlarge the numerical aperture of an objective lens due to the reduced diameter of a laser light spot used in reading and writing of information to the optical disk. Therefore, a difference thereof becomes particularly remarkable. If the value of $|Nx-Ny|$, $|Nx-Nz|$ or $|Ny-Nz|$ exceed the upper limit of the above respective ranges, a C/N ratio which is particularly important in the optical disk properties is lowered.

In order to obtain an optical disk substrate excellent in molding geometry, transparency, birefringence, retardation, toughness, warpage, transfer accuracy, dimensional stability, etc. with the optical molding material according to the present invention by injection molding, the cylinder temperature of an injection molding machine upon molding is preferably 260 to 370° C., more preferably 280 to 360° C., particularly preferably 300 to 360° C., or within a range of preferably from a temperature higher than the glass transition temperature (Tg) of the molding material by 120° C. to 370° C., more preferably from a temperature higher than Tg by 140° C. to 360° C., particularly preferably from a temperature higher than Tg by 160° C. to 360° C.

The mold temperature is preferably 80 to 130° C., more preferably 90 to 130° C., particularly preferably 100 to 130° C., or within a range preferably from a temperature lower than the glass transition temperature (Tg) of the molding material by 70° C. to Tg, more preferably from a temperature lower than Tg by 50° C. to Tg, particularly preferably from a temperature lower than Tg by 30° C. to a temperature lower than Tg by 10° C.

Injection speed (average value to the whole injection stroke) is preferably within a range of 60 to 300 mm/sec, more preferably 80 to 300 mm/sec, particularly preferably 100 to 300 mm/sec. These conditions are desirably combined with one another upon molding and processing.

The injection speed may become a factor that greatly influences the properties of the resulting optical disk substrate, since the influence exerted on the melt viscosity of the optical molding material upon molding is comparatively great. The melt viscosity of the optical molding material upon injection molding is greatly affected by a shear rate ($\gamma$) given by the injection speed and the shape of a mold/molding nozzle.

The shear rate (maximum value on the wall surface) at each part can be calculated in accordance with the following equation according to the shape of the mold/molding nozzle.
(a) In the case where the shape is rectangular (slit):

$$\gamma=6Q/WH^2$$

wherein Q is a flow rate (cm$^3$/sec) per unit time, W is a width (cm) of a flow path, and H is a thickness (cm) of the flow path.
(b) In the case where the shape is circular (annular ring):

$$\gamma=4Q/\pi R^3$$

wherein Q has the same meaning defined above, and R is a radius (cm).

The shear rate ($\gamma$) applied to the gate portion in the mold and/or the nozzle of the molding machine upon the injection molding is with in a range of preferably $1\times10^3$ to $1\times10^6$ sec$^{-1}$, more preferably $5\times10^3$ to $1\times10^6$ sec$^{-1}$, particularly preferably $1\times10^4$ to $1\times10^6$ sec$^{-1}$. If the shear rate ($\gamma$) is lower than $1\times10^3$ sec$^{-1}$, the birefringence, particularly, birefringence in a thicknesswise direction becomes great, and retardation, particularly, scatter of concyclic retardation becomes wide in the resulting optical disk substrate. If the shear rate is higher than $1\times10^6$ sec$^{-1}$ on the other hand, the heat build-up by shearing upon the molding becomes great, resulting in an optical disk substrate easy to cause silver streak at its surface. Therefore, such a low or high shear rate is not preferred.

The control of the shear rate ($\gamma$) can be conducted by controlling the injection speed and adjusting the shape of the mold/molding nozzle as described above. It is preferred that the shear rate be controlled within the above range by adjusting the thickness of the gate to preferably 50 to 900 $\mu$m, more preferably 100 to 600 $\mu$m, particularly preferably 150 to 400 $\mu$m in the case where the form of the mold gate is in the form of a annular slit generally used and the shape of the nozzle in the molding machine so as to give a nozzle diameter of preferably 0.5 to 3.0 mm, more preferably 1.0 to 2.5 mm, particularly preferably 1.5 to 1.8 mm in addition to the control of the injection speed. If the thickness of the mold gate is smaller than 50 $\mu$m, or the nozzle diameter is smaller than 0.5 mm, silver streak is easy to occur upon injection molding, and injection peak pressure becomes extremely high, resulting in the difficulty of conducting stable molding. If the thickness of the mold gate exceeds 900 $\mu$m, or the nozzle diameter exceeds 3.0 mm on the other hand, the birefringence, particularly, birefringence in a thicknesswise direction becomes great, and scatter of retardation, particularly, concyclic retardation becomes comparatively wide in the resulting optical disk substrate. It is hence not preferable to use such a mold/molding nozzle.

In order to obtain a good optical disk substrate excellent in molding geometry, transparency, transfer accuracy, toughness, warpage and dimensional stability and small in birefringence properties, particularly narrow in scatter of concyclic birefringence with the cyclic polyolefin resin in the present invention, it is referable to conduct the injection molding under the following conditions:

Resin temperature (cylinder temperature) upon molding: (Tg+100)° C. to 400° C. (Tg being a glass transition temperature of the thermoplastic resin), preferably (Tg+150)° C. to 390° C., more preferably (Tg+170)° C. to 380° C., particularly preferably (Tg+180)° C. to 360° C.;

Mold temperature: (Tg−100)° C. to (Tg−5)° C., preferably (Tg−70)° C. to (Tg−10)° C., more preferably (Tg−50)° C. to (Tg−20)° C., Shear rate: $4\times10^4$ to $1\times10^6$ sec$^{-1}$, preferably $1\times10^5$ to $1\times10^6$ sec$^{-1}$, more preferably $5\times10^5$ to $1\times10^6$ sec$^{-1}$; and Average residence time of the resin in a molding machine: 5 to 200 seconds, preferably 8 to 150 seconds, more preferably 10 to 100 seconds, particularly preferably 10 to 50 seconds.

If the resin temperature is lower than the lower limit of the above range, the transfer accuracy of the resulting optical disk substrate is lowered, and the birefringence thereof becomes great. If the resin temperature exceeds the upper limit of the above range on the other hand, silver streak often occurs, the toughness of the resulting optical disk substrate is deteriorated, and scatter of concyclic birefringence in the optical disk substrate becomes wide. The term "resin temperature" as used herein means a temperature of the resin in a molten state upon molding, or a resin temperature within a cylinder of an injection molding machine. However, the resin temperature may be substantially replaced by a preset temperature (temperature in a stable state) of the cylinder for reason of the convenience of control.

On the other hand, the mold temperature is lower than the lower limit of the above range, the transfer accuracy of the resulting optical disk substrate is lowered, and the birefringence thereof becomes great. If the mold temperature exceeds the upper limit of the above range on the other hand, warpage of the resulting optical disk substrate becomes great, and scatter of concyclic birefringence in the optical disk substrate becomes wide.

If the shear rate is lower than the lower limit of the above range, the transfer accuracy of the resulting optical disk substrate is lowered, and the birefringence thereof becomes great. If the shear rate exceeds the upper limit of the above range on the other hand, silver streak often occurs, and scatter of concyclic birefringence in the optical disk substrate becomes wide. The shear rate as used herein means a maximum shear rate at the nozzle portion of the injection molding machine.

If the average residence time of the resin in the molding machine is shorter than the lower limit of the above range, the continuous moldability of the optical molding material upon molding is deteriorated because the resin pellets are difficult to be completely evenly melted, and the transfer accuracy of the resulting optical disk substrate is lowered, and the birefringence thereof becomes great. If the average residence time exceeds the upper limit of the above range on the other hand, molecular weight lowering occurs due to the deterioration of the resin by heating to deteriorate the toughness of the resulting optical disk substrate, and scatter of concyclic birefringence in the optical disk substrate becomes wide. The average residence time in the molding machine as used herein can be easily determined in accordance with the following equation:

Average residence time in the molding machine (sec)=V/F wherein V is a cylinder volume ($cm^2$) of an injection molding machine, and F is a feed rate ($cm^3$/sec) to the cylinder.

The control of the shear rate ($\gamma$) can be conducted by controlling the injection speed and adjusting the shape of the nozzle of a molding machine. For example, the shear rate ($\gamma$) (maximum value at the wall surface) of the nozzle portion (in the case of a cylindrical shape) of the molding machine can be calculated in accordance with the equation $\gamma=4Q/\pi R^3$ as described above.

In order to keep the shear rate within the above range, it is controlled by the combination of the injection speed with the nozzle diameter of the molding machine. It is preferred that the shear rate be controlled within the above range by controlling the injection speed to preferably 60 to 300 mm/sec, more preferably 80 to 300 mm/sec, particularly preferably 100 to 300 mm/sec and adjusting the shape of the nozzle so as to give a nozzle diameter of preferably 0.5 to 3.0 mm, more preferably 0.8 to 2.5 mm, particularly preferably 1.0 to 1.8 mm, most preferably 1.2 to 1.5 mm (in the case where the nozzle is tapered, a central value thereof).

If the injection speed is lower than the lower limit of the above range, the birefringence of the resulting optical disk substrate becomes comparatively great, and the transfer accuracy is lowered. If the injection speed exceeds the upper limit of the above range on the other hand, the occurrence of silver streak comparatively increases, and scatter of concyclic birefringence becomes comparatively wide. If the nozzle diameter is smaller than the lower limit of the above range, silver streak is comparatively easy to occur upon molding, the transfer accuracy is comparatively lowered, and scatter of birefringence becomes comparatively wide. If the injection speed exceeds the upper limit of the above range on the other hand, birefringence becomes comparatively great.

The injection molding in the present invention may be conducted in a normal air atmosphere. However, the molding may also be conducted in a nitrogen gas atmosphere upon feeding of the optical molding material to a molding machine and at a hopper portion of the molding machine in order to prevent molecular weight lowering and coloring of the optical molding material and forming of gel.

An optical disk is produced by forming a metal layer for reflecting a laser beam or s recording film layer for reading and writing on the optical disk substrate obtained by the injection molding, and generally forming a protective layer such as a UV-curable resin on the above layer.

Preferably, injection compression molding is conducted. In the process thereof, a compression width is preferably 10 to 500 μm, more preferably 50 to 400 μm, particularly preferably 100 to 300 μm, and injection compression timing is preferably 0 to 1 second, more preferably 0 to 0.5 seconds, particularly preferably 0.1 to 0.3 seconds after completion of injection charging (upon change-over of dwelling; upon change-over of V/P). By controlling the injection compression timing within this range, the optical disk substrate can be provided as a substrate good in transfer accuracy and small in birefringence properties, and particularly, narrow in scatter of concyclic birefringence, so that the properties of the finally resulting optical recording medium are still more improved.

The thus-obtained optical disk substrate according to the present invention is an optical disk substrate obtained by molding the cyclic polyolefin resin as described above, and a variation range of retardation of the resin is controlled within ±10%, preferably ±8%, more preferably ±5%, most preferably ±3% of the retardation at a wavelength of 590 nm when the wavelength of light is changed from 400 nm to 830 nm by regulating molding conditions and the like. The variation range of retardation is preferably controlled within the above range, since a C/N ratio that is particularly important in the optical disk properties is stabilized over a wide light wavelength range.

The dependence of reflective index on wavelength is known to be generally represented by the Cauchy's dispersion equation [Equation (1)].

$$n=A+B/\lambda^2+C/\lambda^4 \qquad \text{Equation 1}$$

wherein n is a refractive index, $\gamma$ is a wavelength (nm), and A, B and C are individually a constant.

On the other hand, since the retardation means a difference (phase difference) in wave surface between ordinary ray and extraordinary ray, and the dependence of retardation on wavelength corresponds to a difference in dependence of refractive index on wavelength between the respective rays, the dependence of retardation on wavelength can also be represented by Equation (1).

When the retardation is checked with the specified range, it is preferable to confirm it from measured values at all wavelengths. However, such measurement is difficult, actually. In general, it is thus possible to confirm the retardation by conducting regression from a plurality of measured values at any points (preferably at least 4 points) in a normal dispersion region (from 400 nm to 830 nm, in this case), using the above Equation (1).

The optical disk according to the present invention features that scatter of the concyclic detardation (birefringence) in the recording area of the disk substrate is preferably at most 20 nm, more preferably at most 15 nm, particularly preferably at most 10 nm, most preferably at most 5 nm. The scatter of the retardation is controlled within this range, whereby the optical properties of the optical disk become excellent, and the C/N ratio thereof is particularly improved. Therefore, the scatter of the retardation preferably falls within this range.

A hard coating layer composed of an inorganic compound, an organosilicon compound such as a silane coupling agent, an acrylic resin, a vinyl resin, a melamine resin, an epoxy resin, a fluorocarbon resin, a silicone resin, or the like can be formed on the surface of a molded product produced by the optical molding material according to the present invention. As examples of means for forming the hard coating layer, may be mentioned publicly known processes such as heat curing, ultraviolet ray curing, vacuum deposition, sputtering and ion plating processes. By the hard coating layer, the heat resistance, optical properties, chemical resistance, abrasion resistance, water resistance and the like of the molded product can be improved.

No particular limitation is imposed on the application field of the optical molding materials according to the present invention, and they may be used over a wide range. More specifically, they may be particularly suitably used as lenses such as spectacle lenses, lenses for general cameras, pick up lenses, lenses for video cameras, telescope lenses and lenses for laser beams; optical disks as recording media capable of reading, writing, or reading and writing information using light (including laser beams) over a wide range, for example, as memory disks, such as optical video disks, audio disks such as compact disks (CD), minidisks (MD) and DVD, phase change type disks, magneto-optical disks (MO), GIGAMO disks, CD-ROM disks, CD-R disks, DVD-RAM disks, DVD-ROM disks, DVD-R disks, and disks for video recording; optical films such as phase difference films, deflection films, transparent conductive films and OHP films; optical materials such as light diffusion plates, light guide plates and liquid crystal display substrates; sealants for optical semiconductors such as photo-interrupters, photocouplers, LED lamps; sealants for IC memories such as IC cards; and optical fibers. Among these, they may be suitably used as the optical disks because they exhibit far excellent properties therefor.

The present invention will hereinafter be described in more detail by the following examples. However, the present invention is not limited by these examples. Incidentally, all designations of "part" or "parts" and "%" as will be used in the following examples mean part or parts by weight and % by weight unless expressly noted or self-evident.

EXAMPLE A-1

A reaction vessel purged with nitrogen was charged with 250 parts of 8-methyl-8-methoxycarbonyltetracyclo-4.4.0.1$^{2,5}$.1$^{7,10}$]-3-dodecene (specified monomer) represented by the following structural formula (1), 41 parts of 1-hexene (molecular weight modifier) and 750 parts of toluene (solvent for ring-opening polymerization reaction), and the resultant solution was heated to 60° C. To the solution in the reaction vessel, were then added 0.62 parts of a toluene solution (1.5 molil) of triethylaluminum and 3.7 parts of a toluene 25 solution (0.05 mol/l) of tungsten hexachloride (t-butanol:methanol:tungsten=0.35 mol:0.3 mol:1 mol) modified with t-butanol/methanol. This reaction system as heated and stirred at 80° C. for 3 hours, thereby conducting a ring-opening polymerization reaction to obtain a solution of a ring-opening polymer. A conversion into the polymer in this polymerization reaction was 97%, and the thus-obtained ring-opening polymer had an inherent viscosity (linh) of 0.45 dl/g as measured at 30° C. in chloroform and a glass transition temperature (Tg) of 204° C.

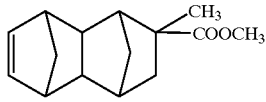

Structural formula (1)

An autoclave was charged with 4,000 parts of the thus-obtained ring-opening polymer solution, 0.48 parts of RuHCl(CO) [P(C$_6$H$_5$)$_3$]$_3$ were added to the ring-opening polymer solution, and the resultant mixture was heated and stirred for 3 hours under conditions of a hydrogen gas pressure of 100 kg/cm$^2$ and a reaction temperature of 165° C., thereby conducting a hydrogenation reaction.

After cooling the resultant reaction solution (hydrogenated polymer solution), the hydrogen gas was released, and the reaction solution was passed through a microfilter having a pore size of 0.5 μm and then poured into a great amount of methanol to coagulate the hydrogenated polymer, thereby isolating and collecting the polymer. The polymer was dried and then pelletized by an extruder having a vent 40 mm in diameter.

The rate of hydrogenation of the hydrogenated polymer (hereinafter referred to as "Resin A-1") thus obtained was substantially 100%, and the number average molecular weight (Mn) and weight average molecular weight (Mw) of the polymer in terms of polystyrene as measured by GPC were 19,800 and 62,000, respectively. Proportions of a component having a molecular weight not higher than 5,000 and a component having a molecular weight not lower than 300,000 were 4% and 3%, respectively. The polymer had an inherent viscosity (ηinh) of 0.47. The content of the component volatilized by heating as described above was 0.04%, and the polymer had a glass transition temperature (Tg) of 165° C. and a gel content of 0.000%.

EXAMPLE A-2

A ring-opening polymerization reaction, a hydrogenation reaction and a coagulating and collecting treatment were conducted in the same manner as in Resin A-1 except that 200 parts of 8-ethylidenetetracyclo-[4.4.0.1$^{2,5}$.1$^{7,10}$]-3-dodecene were used in place of 8-methyl-8-methoxycarbonyltetracyclo[4.4.0.1$^{2,5}$.1$^{7,10}$]-3-dodecene, thereby obtaining a hydrogenated polymer, and the polymer was then pelletized. The rate of hydrogenation of the hydrogenated polymer (hereinafter referred to as "Resin A-2") thus obtained was substantially 100%, and the number average molecular weight (Mn) and weight average molecular weight (Mw) of the polymer in terms of polystyrene as measured by GPC were 19,200 and 58,000, respectively. Proportions of a component having a molecular weight not higher than 5,000 and a component having a molecular weight not lower than 300,000 were 7% and 3%, respectively. The polymer had an inherent viscosity (ηinh) of 0.45. The content of the component volatilized by heating as described above was 0.06%. The polymer had a Tg of 140° C. and a gel content of 0.000%.

EXAMPLE A-3

A ring-opening polymerization reaction, a hydrogenation reaction and a coagulating and collecting treatment were conducted in the same manner as in Resin A-1 except that 230 parts of 8-methyl-8-methoxycarbonyltetracyclo [4.4.0.1$^{2,5}$.1$^{7,10}$]-3-dodecene and 20 parts of bicyclo[2.2.1] hept-2-ene were used, thereby obtaining a hydrogenated polymer, and the polymer was then pelletized. The rate of hydrogenation of the hydrogenated polymer (hereinafter referred to as "Resin A-3") thus obtained was substantially 100%, and the number average molecular weight (Mn) and weight average molecular weight (Mw) of the polymer in terms of polystyrene as measured by GPC were 20,200 and 65,000, respectively. Proportions of a component having a molecular weight not higher than 5,000 and a component having a molecular weight not lower than 300,000 were 3% and 3%, respectively. The polymer had an inherent viscosity (ηinh) of 0.47. The content of the component volatilized by heating as described above was 0.03%. The polymer had a Tg of 140° C. and a gel content of 0.000%.

EXAMPLE A-4

A reaction vessel equipped with a stirrer, a gas inlet tube, a thermometer and a dropping funnel was sufficiently purged with nitrogen gas and charged with 2,000 parts of cyclohexane dehydrated and dried by molecular sieve, and 75 parts of tetracyclo[4.4.0.1$^{2,5}$.1$^{7,10}$]-3-dodecene and 6.6 parts of an n-hexane solution (1 mol/l) of ethylaluminum sesquichloride were added under a nitrogen atmosphere.

A mixed gas of ethylene and nitrogen was then fed (ethylene flow rate: 10 liters/hr; nitrogen flow rate: 40 liters/hr) from the gas inlet tube into the reaction vessel for 10 minutes in a state that the temperature within the reaction vessel was kept at 10° C. Thereafter, 23 parts of an n-hexane solution (0.07 mol/l) of $VO(OC_2H_5)Cl_2$ was added dropwise to this solution from the dropping funnel to initiate a copolymerization reaction to continue the reaction while introducing the mixed gas. After 30 minutes from the start of the reaction, a small amount of methanol was added to the reaction solution to stop the polymerization reaction. The resultant polymer solution was poured into a great amount of methanol to coagulate the polymer (saturated copolymer). The polymer was dried and pelletized as like described above. The number average molecular weight (Mn) and weight average molecular weight (Mw) of the polymer (hereinafter referred to as "Resin A-4") thus obtained in terms of polystyrene as measured by GPC were 21,000 and 63,000, respectively. Proportions of a component having a molecular weight not higher than 5,000 and a component having a molecular weight not lower than 300,000 were 5% and 2%, respectively. The polymer had an inherent viscosity ($\eta$inh) of 0.46. The content of the component volatilized by heating as described above was 0.08%. The polymer had a Tg of 125° C. and a gel content of 0.000%.

EXAMPLE A-5

A glass-made reaction vessel purged with nitrogen was charged with 60 parts of 5-phenylbicyclo[2.2.2]-hept-2-ene and 300 parts of toluene, and 1 part of 1-hexene was added as a molecular modifier. After heating the resultant solution to 40° C., 10 parts of a 15% by weight toluene solution of triethylaluminum, 5 parts of triethylamine and 10 parts of a 20% by weight of a toluene solution of titanium tetrachloride were added as a polymerization catalyst to initiate ring-opening polymerization. At a point of time the reaction was conducted for 1 hour while keeping the temperature of the solution at 40° C., 5 parts of methanol were added to stop the reaction. The resultant reaction solution was poured into a mixed solution of 500 parts of acetone and 500 parts of isopropyl alcohol to precipitate the polymer, and the polymer was isolated and collected to obtain 50 parts of a ring-opening polymer.

A new glass-made reaction vessel purged with nitrogen was charged with 50 parts of the ring-opening polymer obtained and 450 parts of toluene, and the resultant mixture was heated to 55° C. While stirring the mixture, 5 parts of aluminum chloride were added to conduct a cyclizing reaction at 55° C. over 12 hours, and the resultant reaction solution was then poured into 1,000 parts of isopropyl alcohol to collect a polymer precipitated by filtration, thereby obtaining 47 parts of a resin. The intrinsic viscosity of the resin thus obtained was 0.41 dl/g, the Tg was 166° C., and the retention of double bonds in a main chain structure was 32%.

Thirty parts of this resin were dissolved in 70 parts of toluene, and 1 part of a nickel catalyst (containing 0.35 parts of nickel and 0.2 parts of nickel oxide in 1 part of the catalyst; pore volume: 0.8 cm$^3$/g; specific surface area: 300 m$^2$/g) supported on alumina and 2 parts of isopropyl alcohol were added to conduct a reaction for 5 hours at 230° C. and a hydrogen pressure of 50 kg/cm$^2$ to hydrogenate the resin. After completion of the reaction, the catalyst was separated by filtration, and the reaction solution was poured into 500 parts of isopropyl alcohol to collect the polymer precipitated by filtration, thereby obtaining 28 parts of a colorless resin. The resin was dried and then pelletized as like described above. The intrinsic viscosity of the resin (hereinafter referred to as "Resin A-5") thus obtained was 0.41 dl/g, and the Tg was 150° C. The rate of hydrogenation of the resin was substantially 100%, and the retention of double bonds in main chain structure was 0%, and an aromatic ring structure was saturated and not remained. The number average molecular weight (Mn) and weight average molecular weight (Mw) of the resin in terms of polystyrene as measured by GPC were 28,000 and 77,000, respectively. Proportions of a component having a molecular weight not higher than 5,000 and a component having a molecular weight not lower than 300,000 were 4% and 3%, respectively. The resin had an inherent viscosity (ilinh) of 0.53. The content of the component volatilized by heating as described above was 0.07%. The resin had a Tg of 140° C. and a gel content of 0.010%.

Production of Optical Disk Substrate and Property Test

Optical disk substrates 130 mm in diameter and 1.2 mm in thickness were molded from the respective resin pellets by means of an injection molding machine "DISK5MIII" manufactured by Sumitomo Heavy Industries, Ltd. under conditions of a cylinder temperature of 330° C., a mold temperature of 110° C. and an injection speed of 120 mm/sec. The nozzle diameter of the injection molding machine was 1.5 mm (land length: 10 mm), and the thickness of a gate portion of a mold was 300 $\mu$m.

With respect to the resultant respective optical disk substrates, occurrence of silver streak was checked by visual inspection and observation through a microscope and rates of change of the melt viscosity were determined.

With respect to 4 resins of Resins A-1 to A-4, no silver streak occurred on all the resins upon the molding. On Resin A-5, silver streak occurred in a proportion as extremely low as 1% in 100 molded products. The rates of change of the melt viscosity before and after the molding were all within 5%.

Melt viscosities under various conditions for each of Resin A-1 to Resin A-5 were determined. The results are shown in Table 1 with Tg and gel content.

Production of Magneto-optical Disk and Physical Property Test

A film composed of 4 layers of $SiN_x$ (800 Å)/TbFeCo (200 Å)/$SiN_x$ (300 Å)/Al (500 Å) was formed on each of the optical disk substrates by sputtering to produce a magneto-optical disk. Various physical property tests were conducted on the magneto-optical disk thus obtained. The results are shown in Table 2.

COMPARATIVE EXAMPLE a-1

Polycarbonate (PC) "Panlight AD5503" (product of Teijin Chemicals Ltd.; hereinafter referred to as "Resin a-1") having a Tg of 145° C. was used as a comparative resin.

COMPARATIVE EXAMPLE a-2

A ring-opening polymerization reaction, a hydrogenation reaction and a coagulating and collecting treatment were conducted in the same manner as in Example A-1 except that 170 parts of 8-methyl-8-methoxycarbonyltetracyclo [$4.4.0.1^{2,5}.1^{7,10}$]-3-dodecene and 80 parts of bicyclo[2.2.1] hept-2-ene were used, thereby obtaining a hydrogenated polymer, and the polymer was then pelletized. The rate of hydrogenation of the hydrogenated polymer (hereinafter referred to as "Resin a-2") thus obtained was substantially 100%, and the number average molecular weight (Mn) and weight average molecular weight (Mw) of the polymer in terms of polystyrene as measured by GPC were 25,000 and 85,000, respectively. Proportions of a component having a molecular weight not higher than 5,000 and a component having a molecular weight not lower than 300,000 were 8% and 11%, respectively. The polymer had an inherent viscosity (ηinh) of 0.56. The content of the component volatilized by heating as described above was 0.09%.

COMPARATIVE EXAMPLE a-3

A ring-opening polymerization reaction, a hydrogenation reaction and a coagulating and collecting treatment were conducted in the same manner as in Example A-3 except that the amount of 1-hexene (molecular weight modifier) used was changed to 65 parts, thereby obtaining a hydrogenated polymer, and the polymer was then pelletized. The rate of hydrogenation of the hydrogenated polymer (hereinafter referred to as "Resin a-3") thus obtained was substantially 100%, and the number average molecular weight (Mn) and weight average molecular weight (Mw) of the polymer in terms of polystyrene as measured by GPC were 9,000 and 30,000, respectively. Proportions of a component having a molecular weight not higher than 5,000 and a component having a molecular weight not lower than 300,000 were 16% and 1%, respectively. The polymer had an inherent viscosity (ηinh) of 0.37. The content of the component volatilized by heating as described above was 0.16%.

COMPARATIVE EXAMPLE a-4

A ring-opening polymerization reaction, a hydrogenation reaction and a coagulating and collecting treatment were conducted in the same manner as in Example A-3 except that the amount of 1-hexene (molecular weight modifier) used was changed to 15 parts, thereby obtaining a hydrogenated polymer, and the polymer was then pelletized. The rate of hydrogenation of the hydrogenated polymer (hereinafter referred to as "Resin a-4") thus obtained was substantially 100%, and the number average molecular weight (Mn) and weight average molecular weight (Mw) of the polymer in terms of polystyrene as measured by GPC were 60,000 and 310,000, respectively. Proportions of a component having a molecular weight not higher than 5,000 and a component having a molecular weight not lower than 300,000 were 6% and 17%, respectively. The polymer had an inherent viscosity (ηinh) of 0.71. The content of the component volatilized by heating as described above was 0.07%.

COMPARATIVE EXAMPLE a-5

A ring-opening polymerization reaction, a hydrogenation reaction and a coagulating and collecting treatment were conducted in the same manner as in Example A-1 except that 250 parts of 8-methyl-8-methoxycarbonyltetracyclo[4.4.0.1$^{2,5}$.1$^{7,10}$]-3-dodecene were fed to the reaction system over 2 hours to conduct a ring-opening polymerization reaction, thereby obtaining a hydrogenated polymer, and the polymer was then pelletized. The rate of hydrogenation of the hydrogenated polymer (hereinafter referred to as "Resin a-5"[1]) thus obtained was substantially 100%, and the number average molecular weight (Mn) and weight average molecular weight (Mw) of the polymer in terms of polystyrene as measured by GPC were 10,000 and 19,000, respectively. Proportions of a component having a molecular weight not higher than 5,000 and a component having a molecular weight not lower than 300,000 were 6% and 3%, respectively. The polymer had an inherent viscosity (ηinh) of 0.41. The content of the component volatilized by heating as described above was 0.10%.

COMPARATIVE EXAMPLE a-6

A ring-opening polymerization reaction, a hydrogenation reaction and a coagulating and collecting treatment were conducted in the same manner as in Example A-1 except that the amount of 1-hexene and the ring-opening polymerization time were changed to 30 parts and 1 hour, respectively, thereby obtaining a hydrogenated polymer, and the polymer was then pelletized. The rate of hydrogenation of the hydrogenated polymer (hereinafter referred to as "Resin a-6") thus obtained was substantially 100%, and the number average molecular weight (Mn) and weight average molecular weight (Mw) of the polymer in terms of polystyrene as measured by GPC were 8,000 and 45,000, respectively. Proportions of a component having a molecular weight not higher than 5,000 and a component having a molecular weight not lower than 300,000 were 17% and 6%, respectively. The polymer had an inherent viscosity (ηinh) of 0.60. The content of the component volatilized by heating as described above was 0.20%.

COMPARATIVE EXAMPLE a-7

A ring-opening polymerization reaction, a hydrogenation reaction and a coagulating and collecting treatment were conducted in the same manner as in Example A-1 except that the ring-opening polymerization time was changed to 6 hours, and the solution after the hydrogenation was not passed through the microfilter having a pore size of 0.5 μm, thereby obtaining a hydrogenated polymer, and the polymer was then pelletized. The rate of hydrogenation of the hydrogenated polymer (hereinafter referred to as "Resin a-7") thus obtained was substantially 100%, and the number average molecular weight (Mn) and weight average molecular weight (Mw) of the polymer in terms of polystyrene as measured by GPC were 12,000 and 50,000, respectively. Proportions of a component having a molecular weight not higher than 5,000 and a component having a molecular weight not lower than 300,000 were 8% and 6%, respectively. The polymer had an inherent viscosity (ηinh) of 0.45. The content of the component volatilized by heating as described above was 0.08%.

Production of Optical Disk Substrate and Property Test

Optical disk substrates were molded with the respective resin pellets according to the Comparative Examples in the same manner as in the Examples. However, with respect to Resin a-2, the mold temperature was changed to 100° C. to stably conduct the molding because the glass transition temperature (Tg) thereof was low compared with the other resins.

With respect to the resultant respective optical disk substrates, occurrence of silver streak was checked by visual inspection and observation through a microscope and rates of change of the melt viscosity were determined.

No silver streak occurred on all Resins a-1 to Resin a-6 except for Resin a-2. On Resin a-2, silver streak occurred in a proportion of 4% in 100 molded products. On Resin a-7, silver streak occurred in a proportion of 30% in 100 molded products. The rates of change of the melt viscosity before and after the molding were all within 5%.

Melt viscosities under various conditions for each of Resin a-1 to Resin a-7 were determined. The results are shown in Table 1 with Tg and gel content.

Production of Magneto-optical Disk and Property Test

Each of the optical disk substrates formed by Resin a-1 to Resin a-7 was subjected to sputtering in the same manner as in the Examples to produce a magneto-optical disk. Various physical property tests were conducted on the magneto-optical disk thus obtained. The results are shown in Table 2.

<Evaluation of Physical Properties>

(1) Glass Transition Temperature (Tg):

The glass transition temperature (Tg) of each sample was measured at a heating rate of 10° C./min under a nitrogen atmosphere by means of a differential scanning calorimeter (DSC).

(2) Melt Viscosity:

Dynamic frequency distribution measurement at strain of 0.2 degrees was conducted from 160° C. to 320° C. using an MR-500 manufactured by Rheology Co. and a cone plate having a diameter of 20 mm and an angle of 2 degrees. The measured results of the melt viscosity obtained by this measurement were overlapped by the temperature-time conversion rule using the WLF equation to determine melt viscosities at 260° C. and 320° C. from a low shear rate region to a high shear rate region, thereby calculating out respective melt viscosities (poise) under conditions (Conditions 1) of a shear rate of 10 $sec^{-1}$ at 260° C., conditions (Conditions 2) of a shear rate of 10,000 $sec^{-1}$ at 260° C., conditions (Conditions 3) of a shear rate of 10 $sec^{-1}$ at 320° C. and conditions (Conditions 4) of a shear rate of 10,000 $sec^{-1}$ at 320° C.

(3) Gel Content:

At 25° C., chloroform was used as a solvent as to Resin A-1 to Resin A-3, and cyclohexane was used as a solvent as to Resin A-4 and Resin A-5, thereby dissolving each of the respective resin samples in its corresponding solvent so as to give a -concentration of 1%. The solution was filtered through a membrane filter (product of Advantec Toyo K.K.) having a pore size of 0.5 $\mu$m, the weight of which had been measured in advance. After the filtration, the solvent in an amount 3 times of the solution was fed to the filter, and the filter was dried to calculate out a gel content from an increment in weight.

(4) Birefringence of Optical Disk Substrate:

The retardation (nm) of each substrate sample at a wavelength of 633 nm was measured by double pass of vertical incidence at a radial position of 30 mm using an automatic birefringence meter manufactured by Nippon Denshi Kogaku K.K.

(5) Birefringence in a Thicknesswise Direction (Refractive Indexes in Three-dimensional Directions):

An automatic birefringence meter (KOBRA:21ADH) manufactured by Shin-Oji Seishi Co., Ltd.) was used to measure respective refractive indexes, Nx, Ny and Nz as above-mentioned of each sample in the three-dimensional directions at a recording area portion, thereby calculating values of the respective equations to determine a maximum value (absolute value) thereof. Samples for measurement were a transparent optical disk substrate before forming the metal film by sputtering and an optical disk substrate obtained by removing the metal film from an optical disk obtained after sputtering. Although the measurement was conducted on both samples, the value of the sample after the sputtering was indicated because differences were scarcely recognized before and after the sputtering.

(6) C/N Ratio:

The C/N ratio (dB) of an optical disk sample was determined by conducting recording and reproduction on the sample by means of a disk evaluating apparatus to conduct signal evaluation under the following conditions:

Laser power for writing: 7.0 mW;

Laser power for reproduction: 1.0 mW;

Number of revolutions: 1,800 rpm; and

Laser wavelength: 830 nm.

(7) Transfer Accuracy:

An optical disk substrate sample was observed through a scanning electron microscope (SEM) to judge the transfer accuracy from groove depth and configuration of edge, thereby conducting 5-rank evaluation that a good sample was ranked as 5, and a poor sample was ranked as 1.

(8) Toughness:

An optical disk sample was cut at a cutting rate of 5 mm/sec with scissors (CR-HS160; manufactured by Crown Corp.) from the periphery toward a radial center of the sample, thereby measuring a position where crack occurred in the course of the cutting. The crack occurred faster as the material was lower in toughness or brittle, and so the value of the distance became smaller. On the other hand, a sample in which no crack occurred (capable of cutting to the last) was expressed by "NB".

The optical disk sample was passed through a defect detector to determine an error with burr by cutting or peripheral burr, thereby determining a product yield per 100 disks. Burr by cutting and peripheral burr were easier to occur as the material was lower in toughness, thereby lowing the product yield.

TABLE 1

| Resin | Tg (° C.) | Melt Viscosity (Poise) Condition | | | | Gel Content (%) |
| --- | --- | --- | --- | --- | --- | --- |
| | | 1 | 2 | 3 | 4 | |
| Example | | | | | | |
| A-1 | 165 | 27000 | 750 | 2500 | 450 | 0.000 |
| A-2 | 140 | 15000 | 600 | 1300 | 400 | 0.000 |
| A-3 | 140 | 13500 | 400 | 1100 | 350 | 0.000 |
| A-4 | 125 | 8800 | 400 | 850 | 200 | 0.000 |
| A-5 | 140 | 10000 | 500 | 900 | 350 | 0.010 |
| Comparative Example | | | | | | |
| a-1 | 145 | 5000 | 1000 | 500 | 800 | 0.000 |
| a-2 | 115 | 8000 | 300 | 500 | 200 | 0.002 |
| a-3 | 135 | 4000 | 200 | 450 | 100 | 0.000 |
| a-4 | 145 | 60000 | 1000 | 550 | 800 | 0.000 |
| a-5 | 165 | 45000 | 1100 | 4000 | 900 | 0.000 |
| a-6 | 160 | 6000 | 100 | 550 | 80 | 0.000 |
| a-7 | 165 | 26000 | 650 | 2300 | 350 | 0.200 |

TABLE 2

| Resin | Birefringence (nm) | Difference in refractive indexes (absolute value) | | | C/N (dB) 830 nm | Transfer accuracy | Toughness (crack) (mm) | Yield (%) |
|---|---|---|---|---|---|---|---|---|
| | | Nx—Ny | Nx—Nz | Ny—Nz | | | | |
| Example | | | | | | | | |
| A-1 | 30 | 0.00002 | 0.00038 | 0.00037 | 50 | 4 | 60 | 91 |
| A-2 | 30 | 0.00002 | 0.00040 | 0.00040 | 50 | 4 | 55 | 90 |
| A-3 | 15 | 0.00001 | 0.00015 | 0.00016 | 51 | 5 | NB | 95 |
| A-4 | 18 | 0.00001 | 0.00020 | 0.00020 | 50 | 5 | 54 | 90 |
| A-5 | 20 | 0.00001 | 0.00020 | 0.00020 | 50 | 4 | NB | 93 |
| Comparative Example | | | | | | | | |
| a-1 | 60 | 0.00003 | 0.00220 | 0.00210 | 48 | 3 | NB | 95 |
| a-2 | 80 | 0.00006 | 0.00150 | 0.00140 | 48 | 4 | 21 | 80 |
| a-3 | 80 | 0.00006 | 0.00150 | 0.00120 | 49 | 5 | 10 | 50 |
| a-4 | 140 | 0.00011 | 0.00210 | 0.00220 | 47 | 1 | NB | 91 |
| a-5 | 120 | 0.00011 | 0.00210 | 0.00190 | 48 | 2 | 49 | 85 |
| a-6 | 70 | 0.00005 | 0.00055 | 0.00060 | 49 | 4 | 8 | 40 |
| a-7 | 40 | 0.00004 | 0.00042 | 0.00041 | 50 | 4 | 57 | 88 |

It is apparent from the results shown in Tables 1 and 2 that the optical molding materials according to Examples A-1 to A-5 are optical molding material high in transfer accuracy and toughness, small in birefringence, particularly, birefringence occurred in a thicknesswise direction and free of the occurrence of silver streak, and such materials exhibit excellent properties when they are molded into optical disks.

On the other hand, it is apparent that Resin a-1 is great in birefringence in the thicknesswise direction and comparatively low in the C/N ratio. Resin a-2 has a glass transition temperature outside the range of the present invention and is low in heat resistance. Therefore, great warpage occurred when the resultant disk was placed on a clamp to conduct an environmental test for 500 hours at 80° C. and 80% RH. Resins A-1 to A-5, and Resins a-1, a-3 and a-7 underwent no warpage in the same test.

Resin a-3 has a low melt viscosity outside the range of the present invention and is low in toughness and yield, and Resin a-4 has a high melt viscosity outside the range, is great in birefringence, particularly, birefringence in the thicknesswise direction, exhibits lowered C/N ratio and is poor in transfer accuracy. Resin a-5 having a high melt viscosity outside the range of the present invention, is poor in transfer accuracy and great in birefringence, particularly, birefringence in the thicknesswise direction, exhibits lowered C/N ratio, and is also comparatively low in toughness. Resin a-6 has a low melt viscosity outside the range of the present invention, is low in toughness and yield, and wide in scatter of injection peak pressure among shots upon the molding. The properties of the molded product therefrom are also wide in scatter compared with the other molded products. Although Resin a-7 is good in toughness, birefringence and transfer accuracy, silver streak occurs upon the molding.

COMPARATIVE EXAMPLE a-8

The ring-opening polymer (hereinafter referred to as "Resin a-8") before hydrogenation in the course of production of the Resin A-1 as above, was used to try to conducting an injection molding in the same manner as Examples and Comparative examples. Continuous and stable molding could not be conducted because the present Resin a-8 had a high glass transition temperature (Tg) outside the prescribed range.

EXAMPLE B

With respect to optical disk substrates molded in the same manner as described above by respectively using Resins A-1 to A-5 and Resin a-1, a variation range of concyclic retardation and the dependence of retardation on wavelength were determined. Further, various physical property tests were conducted on respective magneto-optical disks produced in the same manner as described above. The results are shown in Tables 3 and 4.

<Evaluation of Physical Properties>

(9) Retardation of Optical Disk Substrate:

In order to determine a variation range ($\Delta$Re: nm) of concyclic retardation, the retardation (Re: nm) of each substrate sample at a wavelength of 633 nm was measured by double pass of vertical incidence at radial positions of 30 mm and 50 mm using an automatic birefringence meter manufactured by Nippon Denshi Kogaku K.K.

(10) Dependence of Retardation on Wavelength:

An automatic birefringence meter (KOBRA:21ADH) manufactured by Shin-Oji Seishi Co., Ltd.) was used to determine dependence of retardation on wavelength. The measurement was conducted at 5 wavelengths of 480, 550, 590, 630 and 750 nm to determine retardation at a wavelength region of 400 to 830 nm by conducting regression using the Cauchy's dispersion equation, thereby calculating out a variation range (%) of retardation at the wavelength region of 400 to 830 nm based on a retardation value at a wavelength of 590 nm.

FIG. 1 illustrates a curve obtained by comparing the measured values obtained as to representative Resin A-3 and Resin a-1 with the dependence of retardation calculated from their values using Equation (1) based on a value at 590 nm and plotting a ratio between both.

Samples for measurement were a transparent optical disk substrate before forming the metal film by sputtering and an optical disk substrate obtained by removing the metal film from an optical disk obtained after sputtering. Although the measurement was conducted on both samples, the value of the sample after the sputtering was indicated because differences were scarcely recognized before and after the sputtering.

(11) C/N Ratio:

The C/N ratio (dB) of an optical disk sample was determined by conducting recording and reproduction on the sample by means of a disk evaluating apparatus to conduct signal evaluation under the following conditions:

Laser power for writing: 7.0 mW;
Laser power for reproduction: 1.0 mW;
Number of revolutions: 1,800 rpm; and
Laser wavelength: 650 nm.

TABLE 3

| Resin | Tg (° C.) | Re (nm) 30 mm | Re (nm) 50 mm | ΔRe (nm) 30 mm | ΔRe (nm) 50 mm |
|---|---|---|---|---|---|
| A-1 | 165 | −20 | 15 | 4 | 5 |
| A-2 | 140 | −30 | 20 | 12 | 15 |
| A-3 | 140 | −14 | 9 | 3 | 4 |
| A-4 | 125 | −24 | 18 | 10 | 12 |
| A-5 | 140 | −18 | 12 | 8 | 9 |
| a-1 | 145 | −35 | 40 | 28 | 33 |

TABLE 4

| Resin | Variation Range of Retardation depending on wavelength (%) | C/N (dB) 650 nm | C/N (dB) 830 nm | Transfer accuracy |
|---|---|---|---|---|
| A-1 | 5 | 50 | 50 | 4 |
| A-2 | 9 | 47 | 50 | 4 |
| A-3 | 2 | 51 | 51 | 5 |
| A-4 | 8 | 47 | 50 | 5 |
| A-5 | 5 | 49 | 50 | 4 |
| a-1 | 13 | 44 | 47 | 3 |

It is apparent from the results shown in Tables 3 and 4 that the optical molding materials according to Examples A-1 to A-5 are narrow in concyclic scatter of retardation, and particularly in the variation range of retardation at a wavelength region of from 400 nm to 830 nm as ±10% based on the value at 590 nm, and so the optical properties become good over a wide range, and excellent properties are exhibited when formed into optical disks in particular.

On the other hand, it is understood that the comparative Resin a-1 is wide in concyclic scatter of retardation, and in the variation range of retardation at a wavelength region of from 400 nm to 830 nm, and so the C/N ratio is small and poor.

EXAMPLE C

Into 100 parts of Resin A-1, were incorporated 25 parts of a C-5 hydrocarbon resin (petroleum resin), and the mixture was melted and kneaded to obtain Resin C-1 having a Tg of 145° C. Resin pellets were then prepared in the same manner as described above.

Optical disk substrates 130 mm in diameter and 1.2 mm in thickness were molded from Resins A-1 to A-5, Resin C-1 and comparative Resin a-1 under their corresponding conditions shown in Table 5. The nozzle diameter of the injection molding machine was 1.5–1.0 mm (land length: 10 mm), and the thickness of a gate portion of a mold was 300 μm.

With respect to the resultant respective optical disk substrates, occurrence of silver streak by visual inspection and observation through a microscope, toughness, warpage, transfer accuracy, birefringence values, and scatter of concyclic birefringence were determined. The results are shown in Table 6.

A measuring test for C/N ratio was conducted on respective magneto-optical disks produced in the same manner as described above respectively-using these optical disk substrates. The results are shown in Table 6.

In this case, the measurement of physical properties was conducted in the following manner. Other measurements than the following measurements were conducted under the conditions already described.

(12) Birefringence of Optical Disk Substrate:

The retardation (nm) of each substrate sample at a wavelength of 633 nm was measured by double pass of vertical incidence at 8 measuring points in a radial position of 50 mm using an automatic birefringence meter manufactured by Nippon Denshi Kogaku K.K. An average value (nm) of the birefringence and concyclic variation range (nm) were determined collectively.

(13) C/N Ratio:

The C/N ratio (dB) of an optical disk sample was determined by conducting recording and reproduction on the sample by means of a disk evaluating apparatus to conduct signal evaluation under the following conditions:

Laser power for writing: 7.0 mW;

Laser power for reproduction: 1.0 mW;

Number of revolutions: 1,800 rpm; and

Laser wavelength: 780 nm.

(14) Toughness:

An optical disk substrate sample was held with a hand with the gate position outside to bend it by forcing the inner central part thereof, thereby evaluating its toughness against breakage by 5 ranks. More specifically, a sample not broken due to high toughness was ranked as 5, and a sample easy to be broken is ranked as 1 (having no toughness).

(15) Warpage:

A mechanical property measuring apparatus LM100-A (manufactured by Ono Sokki K.K.) was used to measure a tilt (mrad).

(16) Silver Streak:

Among 100 optical disk substrates molded, the number of optical disk substrates on which silver streak occurred was determined.

TABLE 5

| | | Molding conditions | | | | | |
|---|---|---|---|---|---|---|---|
| | | | | | Average | Injection Compression | |
| | Resin | Resin temp. (° C.) | Mold temp. (° C.) | Shear Rate (Sec$^{-1}$) | Residence time (Sec) | Compression width (μm) | Timing (Sec) |
| Production Example | | | | | | | |
| 1 | A-1 | 360 | 130 | 6 × 10$^5$ | 40 | 200 | 0.1 |
| 2 | A-2 | 330 | 110 | 5 × 10$^4$ | 30 | 100 | 0.3 |

TABLE 5-continued

| | | Molding conditions | | | | | |
|---|---|---|---|---|---|---|---|
| | | | | | Average | Injection Compression | |
| | Resin | Resin temp. (° C.) | Mold temp. (° C.) | Shear Rate (Sec$^{-1}$) | Residence time (Sec) | Compression width (μm) | Timing (Sec) |
| 3 | A-3 | 330 | 110 | 8 × 10$^5$ | 35 | 200 | 0.1 |
| 4 | A-4 | 330 | 100 | 1 × 10$^5$ | 40 | 200 | 0.1 |
| 5 | A-5 | 330 | 110 | 6 × 10$^4$ | 20 | 200 | 0.2 |
| 6 | A-3 | 330 | 110 | 6 × 10$^5$ | 30 | 5 | 0.1 |
| 7 | A-3 | 330 | 110 | 6 × 10$^5$ | 30 | 600 | 0.1 |
| 8 | A-3 | 330 | 110 | 6 × 10$^5$ | 35 | 0 | Not compressed |
| 9 | A-3 | 330 | 110 | 6 × 10$^5$ | 35 | 200 | 0.5 |
| 10 | C-1 | 330 | 110 | 6 × 10$^5$ | 30 | 200 | 0.1 |
| Comparative Production Example | | | | | | | |
| 1 | a-1 | 330 | 110 | 6 × 10$^5$ | 40 | 200 | 0.1 |
| 2 | A-1 | 260 | 130 | 6 × 10$^5$ | 50 | 200 | 0.1 |
| 3 | A-2 | 410 | 110 | 6 × 10$^5$ | 40 | 200 | 0.1 |
| 4 | A-3 | 360 | 30 | 6 × 10$^5$ | 180 | 200 | 0.1 |
| 5 | A-5 | 330 | 137 | 6 × 10$^5$ | 100 | 200 | 0.1 |
| 6 | A-4 | 330 | 100 | 1 × 10$^4$ | 50 | 200 | 0.1 |
| 7 | A-3 | 330 | 110 | 2 × 10$^6$ | 50 | 200 | 0.1 |
| 8 | A-3 | 330 | 110 | 9 × 10$^5$ | 4 | 260 | 0.1 |
| 9 | A-3 | 360 | 110 | 6 × 10$^5$ | 300 | 200 | 0.1 |

TABLE 6

| | Silver streak | Toughness | Warpage (mrad) | Transfer accuracy | Birebringence (nm) | ΔRe (nm) | C/N (Db) |
|---|---|---|---|---|---|---|---|
| Production Example | | | | | | | |
| 1 | 0 | 4 | 2.5 | 5 | 15 | 6 | 42 |
| 2 | 0 | 4 | 3.0 | 4 | 25 | 10 | 41 |
| 3 | 0 | 5 | 2.0 | 5 | 10 | 4 | 43 |
| 4 | 0 | 4 | 3.0 | 5 | 20 | 10 | 41 |
| 5 | 1 | 5 | 3.0 | 4 | 20 | 9 | 41 |
| 6 | 0 | 5 | 3.0 | 4 | 20 | 9 | 40 |
| 7 | 0 | 5 | 3.0 | 4 | 20 | 8 | 40 |
| 8 | 0 | 5 | 3.0 | 4 | 20 | 8 | 40 |
| 9 | 0 | 5 | 3.0 | 4 | 20 | 8 | 40 |
| 10 | 1 | 4 | 3.0 | 4 | 20 | 10 | 40 |
| Comparative Production Example | | | | | | | |
| 1 | 0 | 5 | 2.0 | 4 | 100 | 28 | 37 |
| 2 | 0 | 4 | 3.0 | 2 | 50 | 20 | 38 |
| 3 | 30 | 1 | 6.5 | 5 | 20 | 20 | 36 |
| 4 | 5 | 3 | 3.0 | 1 | 50 | 25 | X |
| 5 | 3 | 5 | 10.0 | 1 (Deformed) | 10 | 20 | X |
| 6 | 0 | 4 | 3.0 | 3 | 40 | 15 | 38 |
| 7 | 20 | 4 | 3.0 | 5 | 5 | 20 | 38 |
| 8 | 0 | 5 | X (Great) | 2 | 35 | 10 | X |
| 9 | 10 | 1 | 3.0 | 5 | 5 | 20 | 38 |

It is apparent from the results shown in Tables 5 and 6 that according to the production method related to Production Examples 1 to 10, the occurrence of silver streak upon production is prevented, and optical disk substrates high in transfer accuracy and toughness, small in warpage and birefringence properties, particularly, narrow in scatter of concyclic birefringence, and good in optical disk properties are provided.

On the other hand, comparative Resin a-1 is not a cyclic polyolefin resin, great in birefringence, wide in scatter of birefringence and poor in optical disk properties. The production conditions of Comparative Production Examples 2 to 9 are outside the specified ranges. According to Comparative Production Example 2, the resultant optical disk substrate is great in birefringence, wide in scatter of birefringence and poor in optical disk properties. According to Comparative Production Example 3, silver streak often occurs, and the resultant optical disk substrate is low in toughness, great in warpage, wide in scatter of birefringence and poor in optical disk properties. According to Comparative Production Example 4, the resultant optical disk substrate is poor in transfer accuracy, great in birefringence, wide in scatter of birefringence and poor in optical disk properties (In Table 6, "x" means unmeasurable). According to Comparative Production Example 5, the resultant optical disk substrate is great in warpage, poor in transfer accuracy, wide in scatter of birefringence and poor in optical disk properties. According to Comparative Production Example 6, the resultant optical disk substrate is poor in transfer accuracy, great in birefringence and poor in optical disk properties. According to Comparative Production Example 7, silver streak often occurs, and the resultant optical disk substrate is wide in scatter of birefringence and poor in optical disk properties. According to Comparative Production Example 8, continuous moldability is poor, and the resultant optical disk substrate is great in warpage and birefringence and poor in transfer accuracy and optical disk properties. According to Comparative Production Example 9, the resultant optical disk substrate is poor in toughness, scatter of birefringence and optical disk properties.

What is claimed is:

1. An optical molding material comprising a cyclic polyolefin resin having a glass transition temperature (Tg) not lower than 120° C., but not higher than 170° C., wherein the melt viscosity of the cyclic polyolefin resin at 260° C. is 5,000 to 50,000 poises as measured at a shear rate($\gamma$) of 10 sec$^{-1}$ and 200 to 1,000 poises as measured at a shear rate($\gamma$) of 10,000 sec$^{-1}$, and the melt viscosity of the cyclic polyolefin resin at 320° C. is 500 to 5,000 poises as measured at a shear rate($\gamma$) of 10 sec$^{-1}$ and 100 to 800 poises as measured at a shear rate($\gamma$) of 10,000 sec$^{-1}$.

2. The optical molding material according to claim 1, wherein the gel content is at most 0.1% by weight.

3. The optical molding material according to claim 1 or 2, wherein the cyclic polyolefin resin is a specific cyclic polyolefin resin which is at least one selected from the group consisting of a ring-opening polymer of a monomer (hereinafter referred to as "specified monomer") represented by the following general formula (I), a ring-opening copolymer of the specified monomer and a copolymerizable monomer, hydrogenated polymers of these ring-opening polymer and ring-opening copolymer, and a saturated copolymer of the specified monomer and an unsaturated double bond-containing compound.

General formula (I)

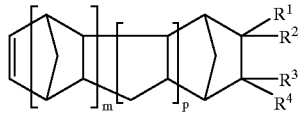

wherein $R^1$ to $R^4$ are individually a hydrogen atom, a halogen atom, a hydrocarbon group having 1 to 10 carbon atoms or any other monovalent organic group and may be the same or different from one another, or $R^1$ and $R^2$ or $R^3$ and $R^4$ may form a divalent hydrocarbon group together with each other, or $R^1$ or $R^2$ and $R^3$ or $R^4$ may be bonded to each other to form a monocyclic or polycyclic structure, m is 0 or a positive integer, and p is 0 or a positive integer.

4. An optical disk substrate obtained by molding the optical molding material according to any one of claims 1 to 3.

5. The optical disk substrate according to claim 4, wherein the recording area portion of the optical disk substrate satisfies the following relationships:

|Nx–Ny|≦0.0001;

|Nx–Nz|≦0.002; and

|Ny–Nz|≦0.002;

wherein Nx is a refractive index in a radial direction in the plane of the disk, Ny is a refractive index in a direction perpendicular to the radial direction in the same plane, and Nz is a refractive index in a direction perpendicular to the same plane.

6. An optical molding material comprising a cyclic polyolefin resin, wherein a variation range of retardation of the resin is within ±10% of the retardation at a wavelength of 590 nm when the wavelength of light is changed from 400 nm to 830 nm.

7. The optical molding material according to claim 6, wherein the cyclic polyolefin resin is the specified cyclic polyolefin resin according to claim 3.

8. An optical molded product obtained by molding a cyclic polyolefin resin, wherein a variation range of retardation of the molded product is within ±10% of the retardation at a wavelength of 590 nm when the wavelength of light is changed from 400 nm to 830 nm.

9. An optical disk substrate obtained by molding a cyclic polyolefin resin, wherein a variation range of retardation of the optical disk substrate is within ±10% of the retardation at a wavelength of 590 nm when the wavelength of light is changed from 400 nm to 830 nm.

10. A method for producing an optical disk substrate, which comprises injection-molding a thermoplastic resin comprising a cyclic polyolefin resin under conditions of a resin temperature of (Tg+100)° C. to 400° C. (Tg being a glass transition temperature of the thermoplastic resin; the same shall apply hereinafter), a mold temperature of (Tg–100)° C. to (Tg–5)° C., a shear rate of 4×10$^4$ to 1×10$^6$ sec$^{-1}$ and average residence time of the thermoplastic resin in a molding machine of 5 to 200 seconds.

11. The method according to claim 10, wherein the cyclic polyolefin resin is the specified cyclic polyolefin resin according to claim 3.

* * * * *